US011847635B2

(12) United States Patent
Ortiz et al.

(10) Patent No.: US 11,847,635 B2
(45) Date of Patent: Dec. 19, 2023

(54) PAYMENT CARD WITH SECURE ELEMENT AND REPLENISHABLE TOKENS

(71) Applicant: ROYAL BANK OF CANADA, Montreal (CA)

(72) Inventors: Edison U. Ortiz, Orlando, FL (US); Mohit Murli Ahuja, Mississauga (CA)

(73) Assignee: ROYAL BANK OF CANADA, Montréal (CA)

( * ) Notice: Subject to any disclaimer, the term of this patent is extended or adjusted under 35 U.S.C. 154(b) by 32 days.

(21) Appl. No.: 16/521,284

(22) Filed: Jul. 24, 2019

(65) Prior Publication Data
US 2020/0034830 A1    Jan. 30, 2020

Related U.S. Application Data

(60) Provisional application No. 62/702,727, filed on Jul. 24, 2018.

(51) Int. Cl.
*G06Q 20/36* (2012.01)
*G06Q 20/32* (2012.01)
*G06Q 20/22* (2012.01)

(52) U.S. Cl.
CPC ....... *G06Q 20/3672* (2013.01); *G06Q 20/227* (2013.01); *G06Q 20/3227* (2013.01); *G06Q 20/3278* (2013.01); *G06Q 20/3678* (2013.01)

(58) Field of Classification Search
CPC .......... G06Q 20/322; G06Q 20/3226–20/327; G06Q 20/3278; G06Q 20/34–20/341; G06Q 20/343; G06Q 20/349–20/3563; G06Q 20/3572–20/3576; G06Q 20/351; G06Q 20/3574; G06Q 20/30–3678; G07F 7/08–7/0846; H04L 9/32; G06K 19/0725
See application file for complete search history.

(56) References Cited

U.S. PATENT DOCUMENTS

| | | | | |
|---|---|---|---|---|
| 10,057,225 | B1* | 8/2018 | Hayes | G06Q 20/223 |
| 2006/0124756 | A1* | 6/2006 | Brown | G07F 7/0833 |
| | | | | 235/492 |
| 2008/0017704 | A1* | 1/2008 | VanDeburg | G07F 7/025 |
| | | | | 235/380 |
| 2009/0143104 | A1* | 6/2009 | Loh | G06Q 20/352 |
| | | | | 455/558 |
| 2013/0024364 | A1* | 1/2013 | Shrivastava | G06Q 20/12 |
| | | | | 705/39 |

(Continued)

*Primary Examiner* — Jacob C. Coppola
(74) *Attorney, Agent, or Firm* — Norton Rose Fulbright Canada LLP

(57) ABSTRACT

An electronic payment device and methods of its operation are disclosed. The payment device has a secure element for storing payment tokens, each associated with a payment card; an input interface that enables a user to select from among the payment cards; a display interface; and a processor. In response to a user selection of one of the payment cards by way of the input interface, a descriptor of the selected payment card is displayed by way of the display interface; and an unconsumed one of the payment tokens associated with the selected payment card is activated to prepare the payment card device for effecting payment using the selected payment card, thereby consuming the payment token. The payment device also includes a wireless communication interface for receiving additional payment tokens, thereby replenishing the payment tokens.

22 Claims, 17 Drawing Sheets

(56) References Cited

U.S. PATENT DOCUMENTS

| | | | |
|---|---|---|---|
| 2013/0117822 A1* | 5/2013 | Soulez | G06Q 20/425 726/4 |
| 2014/0325632 A1* | 10/2014 | De Jong | G06K 19/07716 726/9 |
| 2015/0199679 A1* | 7/2015 | Palanisamy | G06Q 20/385 705/67 |
| 2015/0339663 A1* | 11/2015 | Lopreiato | G06Q 20/385 705/69 |
| 2016/0132878 A1* | 5/2016 | O'Regan | G06Q 20/32 705/75 |
| 2016/0180306 A1* | 6/2016 | Koeppel | G06Q 20/409 705/41 |
| 2016/0259929 A1* | 9/2016 | Cash | G06Q 20/341 |
| 2016/0335529 A1* | 11/2016 | Mullen | G06K 19/07709 |
| 2016/0379203 A1* | 12/2016 | Elhaoussine | G06Q 20/327 705/66 |
| 2017/0103382 A1* | 4/2017 | Kim | G06Q 20/204 |
| 2017/0178116 A1* | 6/2017 | Savolainen | G06Q 20/3227 |
| 2018/0101830 A1* | 4/2018 | Maddocks | G06Q 20/3821 |
| 2018/0181958 A1* | 6/2018 | Locke | G07F 7/0826 |
| 2018/0268405 A1* | 9/2018 | Lopez | G06Q 20/385 |
| 2019/0020478 A1* | 1/2019 | Girish | H04L 63/083 |
| 2019/0197517 A1* | 6/2019 | Senguttuvan | G06K 19/0723 |
| 2019/0197616 A1* | 6/2019 | Dogin | G06Q 20/10 |
| 2019/0272541 A1* | 9/2019 | Koeppel | H04W 12/12 |

\* cited by examiner

PAYMENT CARD WITH SECURE ELEMENT AND REPLENISHABLE TOKENS

CROSS-REFERENCE TO RELATED APPLICATIONS

This application also claims all benefit, including priority of U.S. Provisional Patent Application Ser. No. 62/702,727, filed Jul. 24, 2018, the entire contents of which are incorporated herein by this reference.

FIELD

This disclosure generally relates to electronic payment, and more specifically to devices for payment at a point-of-sale terminal.

DISCLAIMER

Aspects of the material disclosed in this application relate to the creation, administration, manipulation, processing, and storage of data useful in processing of payment transactions. Aspects of such creation, administration, manipulation, processing, and storage may be subject to regulation by governmental and other agencies. The disclosure herein is made solely in terms of logical, economic, and communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

BACKGROUND

Electronic payments are a type of electronic signal exchange, or electronic data transaction, that have provided significant benefits to human kind. In addition to numerous benefits, such transactions are associated with numerous risks. Although many different forms of such transactions have been proposed, there remains significant room for improvement, including for example in terms of security, efficiency, and convenience in usability, particularly for purchasers, account administrators, and merchants.

Mobile and other e-commerce payments are categories of electronic payment initiated from mobile, desktop, and/or other devices, as opposed to more conventional forms of payments, such as cash, debit cards, credit cards, and/or pre-paid cards. Some mobile and e-commerce payment transactions utilize mobile or other virtual wallets, which are programs or applications on a user's device that store the user's personal information, including credentials for one or more authorized payment methods. For example, the user may input and store multiple credit card numbers, bank account numbers, coupons, loyalty, gift, and reward program account numbers, and others, and, using logical functionality built into the wallet(s), select which of several payment forms to use in association with a transaction, designate and confirm payment amounts and other transaction details, and otherwise manage or control transactions and accounts to be used in transactions. The use of secure elements, encryption, tokenization, and other techniques can be used to enhance the security of mobile and other virtual wallets and protect the user's payment credentials and other sensitive information stored inside.

While virtual wallets have provided improved convenience for purchasers and account holders, they have tended to be limited to the use of single funding or payment accounts. Moreover, to date such wallets have been tied to individual account administrators, such as issuing financial institutions (FIs) for credit cards, banks for demand/deposit accounts, etc. This can result in significant inconvenience for the consumer, or other purchaser, who is authorized to complete transactions by drawing on accounts administered by more than one FI and who, in order to do so, must deal with multiple virtual wallets on a single device.

To initiate many types of transaction using a virtual wallet, a user can approach a merchant point-of-sale (POS) terminal and present the mobile device for scanning or some other type of data exchange. For example, in a Near Field Communication (NFC) transaction, an NFC reader will request payment credentials and/or other transaction-specific information from the mobile device when the two are brought into close proximity with one another. Similarly, payment credentials and transaction information can be exchanged between the mobile wallet and merchant POS terminal using visual patterns, such as barcodes and QR codes, which are displayed on the mobile device for scanning by the merchant POS terminal. Mobile payment transactions may also require some type of user authentication, such as the inputting of a PIN or identifying biometric, before they will be processed, although user authentication is not always required.

Alternatively, electronic transactions may be initiated by using mobile or stationary computing devices to navigate to or otherwise access merchant e-commerce websites and/or applications, and thereafter using input devices such as keyboards, keypads, touchscreens, etc., to enter commands adapted to initiate communications sessions with associated merchant transaction systems.

Whether initiated at a merchant POS terminal or from a networked mobile or desktop device accessing a website, such as an application or other program associated with a merchant, transaction data may also be transmitted via one of potentially many different payment networks for processing, authorization, and settlement with a bank or financial institution. However, as each merchant or merchant program or application may be associated with a different payment network, the user may be left limited in the types and/or methods of payment that are available from that merchant or application. For example, although it may be convenient or otherwise advantageous for a purchaser to use one of many accounts available to the purchaser to complete a transaction, which accounts may or may not be associated with an bank or other account administrator acceptable to a merchant, or may offer or not offer advantageous interest rates, loyalty points, or other rewards, a particular merchant may not accept a certain type of payment, and/or one or more demand deposit accounts may not have adequate funds (or other payment resources) available to complete a transaction.

Transaction settlement is a process upon which performance metrics, security concerns, and ease of traversal are considerations that need to be factored into potential solutions. Various trade-offs may need to be made between each consideration, and the structure and architecture of a potential solution may aid in improving performance across one or more factors.

SUMMARY

In aspect of the present disclosure, there is provided an electronic payment device. The device includes a secure element for storing a plurality of consumable payment tokens, each of the tokens associated with one of a plurality of payment cards; an input interface that enables a user to select from among the plurality of payment cards; a display interface; a processor in communication with the input interface, the secure element, and the display interface. The processor when executing code, causes the device to, in response to a user selection of one of the plurality of payment cards by way of the input interface, display a descriptor of the selected payment card by way of the display interface and activate an unconsumed one of the payment tokens associated with the selected payment card to prepare the payment device for effecting payment using the selected payment card when the payment device is presented to a point-of-sale terminal, thereby consuming the activated payment token. The device also includes a wireless communication interface configured to receive at least one additional payment token, and thereby replenish the plurality of consumable payment tokens.

In accordance with another aspect of the present disclosure, there is provided a processor-implemented method of maintaining unconsumed payment tokens at an electronic payment device. The method comprises storing, in a secure element, a plurality of payment tokens, each of the tokens associated with one of a plurality of payment card; in response to receiving a user selection of one of the plurality of payment cards, activating one of the plurality of payment tokens associated with the selected payment card; updating the secure element to reflect the activated payment token as being consumed; receiving a query, by way of a wireless communication interface, regarding the quantity of unconsumed payment tokens associated with each of the plurality of payment cards; and receiving at least one additional payment token, by way of the wireless communication interface, to replenish the plurality of payment tokens.

In accordance with yet another aspect of the present disclosure there is provided an electronic identification card that has a secure element for storing a plurality of identity tokens; an input interface that enables a user to select from among the plurality of identity tokens; a display interface; a processor in communication with the input interface, the secure element, and the display interface. The processor when executing code, causes the device to: in response to a user selection of one of the plurality of identity tokens by way of the input interface: display a descriptor of the selected identity token by way of the display interface; and activate the selected identity tokens to be readable by NFC communication.

Many further features and combinations thereof concerning the present improvements will appear to those skilled in the art following a reading of the instant disclosure.

These drawings depict exemplary embodiments for illustrative purposes, and variations, alternative configurations, alternative components and modifications may be made to these exemplary embodiments.

DETAILED DESCRIPTION

Embodiments described herein relate to systems and processes for tokenized payments involving connected devices with secure elements. Connected devices are used by consumers. Embodiments described herein relate to systems and processes for payment cards embedded into connected devices to enable consumers to use connected devices as part of the payment process.

Embodiments described herein relate to a device configured as a payment card device with a secure element. The device can be an electronic device or an object with electronic components. The payment card device can have a transceiver, such as a Bluetooth transceiver, NFC transceiver, or other wireless transceiver, for example. The payment card device can connect over a Bluetooth connection to another device, such as a mobile phone, to load the payment card device with multiple payment tokens. In some embodiments, the payment card device may be loaded with payment tokens for a plurality of payment cards. The different payment cards can then be cycled through or selected for use on the payment card device, e.g., by pressing a button. The payment card device can then be tapped (e.g., to exchange data by near-field communication, at a merchant device to make a payment using a token of the selected payment card.

Embodiments described herein can establish connections between connected devices (providing the payment card) and a secure cloud service to deliver value for consumers via digital channels and smart devices, and improves their life by providing easy access to their financial instruments on any mobile or connected devices. Embodiments described herein can provide consumers with easy access to a digital or electronic wallet to conduct trusted and secure transactions for any forms of commerce. For example, the mobile device can have an electronic wallet that connects to the payment card for managing tokens. This might not require incremental authentication. The payment card can be used for the payment process so there might not be a requirement on the consumer to keep their mobile device handy (e.g. the payment card with secure element can be used for the payment process). Embodiments described herein can provide an easy payment selection process using a button on the payment card. Embodiments described herein can provide a payment process that does not need to authenticate the user multiple times to keep on using the payment card for the payment process.

Figure 1:
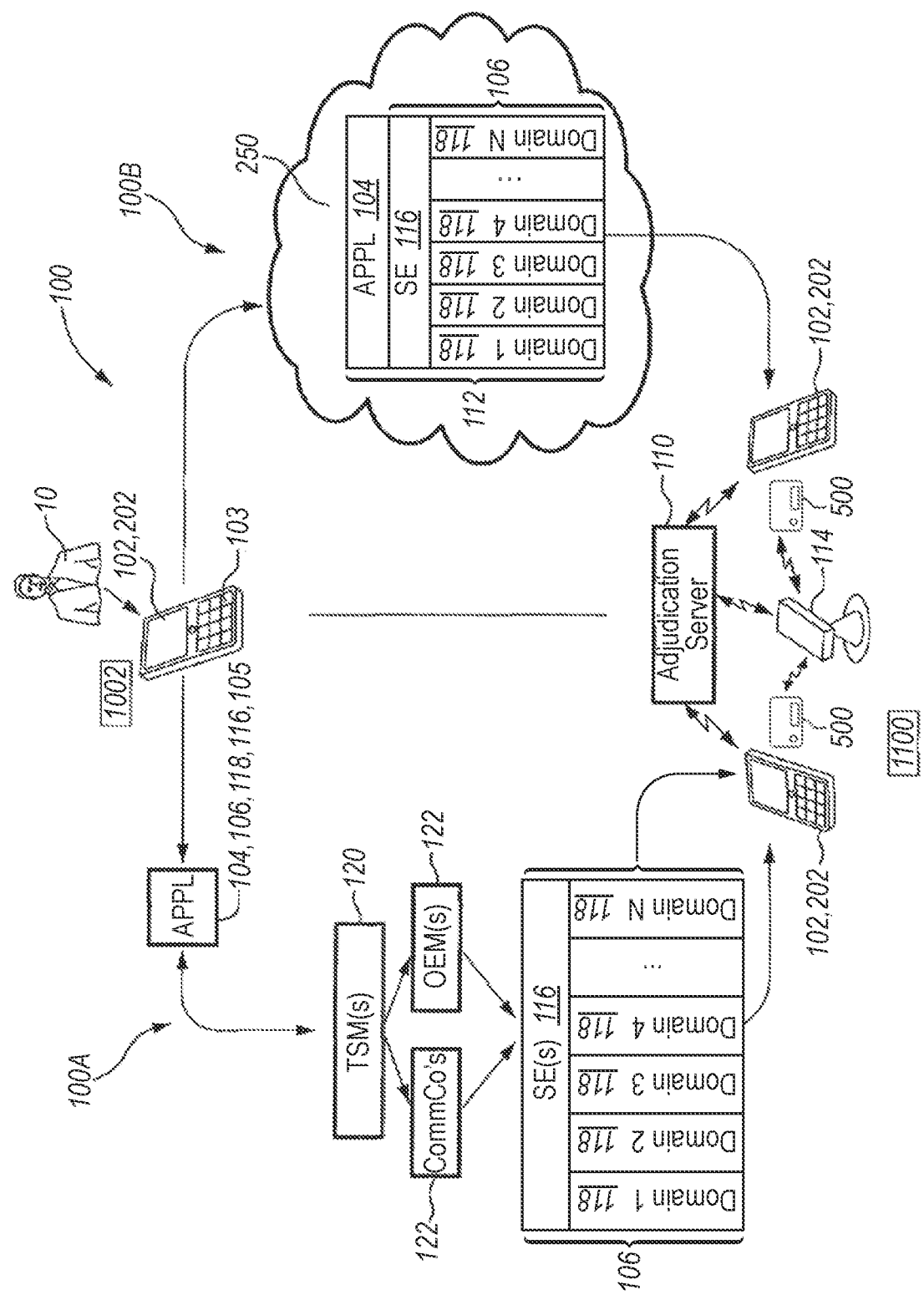
FIG. 1, FIG. 2, FIG. 3, and FIGS. 4A-4E are schematic diagrams showing embodiments of systems and secure storage facilities, and associated processes and devices, in accordance with aspects of the disclosure.

FIG. 1 is a schematic diagram showing an example system 100 suitable for use in implementing secure data processes. In FIG. 1, two architectures or subsystems 100A, 100B, and processes for requesting, authorization, and execution of secure data processing and storage of data thereby are illustrated. As will be understood by those skilled in the relevant arts, once they have been made familiar with this disclosure, architectures or subsystems 100A, 100B are not exclusive or incompatible with each other; rather they may advantageously be used separately, or in combination or in parallel with each other to achieve results in accordance with various embodiments described herein.

In the embodiment(s) shown, system 100 and subsystems 100A, 100B comprise, among other components, one or more transaction or data processing request devices 102, such as mobile device(s) 202, 203, desktop device(s) 402 (FIG. 2), or other data processing devices; data processing applications 104, such as virtual wallet(s) useful in purchase transactions, or image processing applications; persistent memory(ies) 106; and transaction or authentication adjudication server(s) 110. Data processing request devices 102 may be used in conjunction with payment card devices 500 in manners described herein.

In the architecture/embodiment of 100A, application 104 and/or memory(ies) 106, 116, 118 are stored on the user device 102, 202. In the embodiment 100B, some or all of application(s) 104 and/or memory(ies) 106, 116, 118 are stored in secure storage in the cloud, for example in a secure networked server.

At 1002, a purchaser such as a smart card holder, or other user, 10 of a process or transaction request device 102 can use a keypad, keyboard, touchscreen, or other input device 103 to access a data processing application 104, which application can reside wholly or partially on any or all of request device 102, financial or other application server 112, and/or any other suitably-accessible networked processing device. Application(s) 104 can access persistent memory(ies) 106 to read or otherwise access identifiers associated with the purchaser or user; the request device 102, and/or application(s) 104, such as financial account information to be used in a purchase transaction, and or all of which identifiers may be stored in, for example, one or more secure element(s) 116, and/or (sub)domains 118 thereof.

For example, at 1002, a purchaser device such as a smart (or chip) card such as payment card device 500, or a mobile computing/communications device (PDA) such as a smart phone, tablet, or laptop computer, or networked processor such as a desktop computer, can be used to create, access, and/or otherwise process securely-stored data related to one or more purchaser accounts. In the storage embodiment shown at 100A, a secure element 116 comprising purchaser financial data, which can for example include account and/or pre-authorized payment information (e.g., a secure payment token) is securely stored in persistent memory on the purchaser device 102, or in a similar secure element 516 (FIG. 7) of payment card device 500. In the embodiment shown at 100B, such data is stored in a secure element (SE) such as a secure cloud-based communications facility, such as a cloud-based SSD, maintained or otherwise controlled in this example by a bank or other financial institution. In both cases, SE sub-domains 118 can be provided in the secure memory(ies) 106 and used, for example, to securely store authorization and other data related to a plurality of applications, such as, in a payment transaction context, purchaser and/or account information related to a number of different purchaser accounts ("Visa (VMPA)"; "Master Card," "Pay-Pass," "MDA," "Debit (MDA)", and "VAS") and/or payments.

At 1110, at the bottom of FIG. 1, a payment card device 500 is used to participate in a purchase or other transaction at a vendor or merchant point-of-sale (POS) device 114, such as an NFC (near-field communication) enabled device and/or card reader(s) 115.

Each of the (sub)systems 100A, 100B of FIG. 1 offers a variety of advantages. For example, in the embodiment shown at 100A, storage of application 104 and/or various types of authorization and transaction data in memory(ies) 106, 116, 118 on user or requesting device(s) 102, 202 enables the owner, administrator, and/or other user of the device 102, 202 to retain custody and control of the application 104 and/or memory(ies) 106, 116, 118, and responsibility therefor. For many users, this provides, for example, increased comfort in the knowledge that they themselves can provide ultimate security responsibility. Provisioning of such application(s) 104 and data stored in such elements 106, 116, 118 can be provided by any or all of communications service provider systems 122, original equipment manufacturers 124, and/or other trusted service provider or manager (TSM) systems 120, which can provide added value in the form of, for example, add-on applications and ancillary services.

A further significant advantage of the embodiment 100A is that an application wholly or partially stored on a device 102, 202, can provide security in binding the application to the specific device 102, 202, using hardware, firmware, or software features, using for example Global Platform (GP) standards. This can, for example, be used in either of embodiments 100A, 100B to confirm that a requesting user of a device 102, 202; the specific device 102, 202 used to generate the request; and account or other application information provided in a transaction or other data processing request are properly related, bound, to each other, and thereby, through comparison to authorization or authentication information stored by or otherwise available to an independent transaction or processing request adjudicator, to authorize a requested transaction or other data process.

By linking multiple, independent identity and function factors, such three-fold or other multiple-factor authentication features, architectures such as that shown at 100B, provide markedly superior authorization/authentication possibilities.

By providing such multi-parameter authorization processes, in which some or all of application(s) 104 and/or various types of authorization and transaction data may be stored in memory(ies) 106, 116, 118 in secure devices in the cloud (i.e., in devices accessible to the devices 102, 220, 114, 120, etc., via any one or more public and/or private local or wide area networks 250), system 100 enables a number of further advantages, including for example superior physical security for sensitive data; reduction(s) in the amount of inter-device/inter-system communications by reducing or eliminating the need for TSMs and other intermediaries; allows many service providers, including a variety of banks or other transaction service providers, to leverage existing platforms or infrastructure, and opens new possibilities for expanded services and efficiencies.

A significant improvement enabled by the present disclosure is the provision and unified control of a number of secure applications within a single wallet or other control application. This aspect of the disclosure can be particularly advantageous where, for example, a number of similar, or otherwise corresponding, applications, are provided on, or through, a single user device 102, 202, etc. For example, in the context of financial transactions, a single 'wallet' application can provide access to data and instructions adapted for use and control of transactions using accounts held and/or otherwise administered by a number of independent financial institutions. For example, a user having accounts with multiple banks and/or payment accounts held by different institutions can use various aspects of the disclosure to commonly and/or selectively store, access, and control the various accounts. Among the further advantages offered by this aspect of the disclosure is that a first institution, such as a bank or credit card company, that provides access to such a wallet or other application, can make memory and processing capacity available to other, non-affiliated institutions, and derive revenue thereby.

When, for example, a user of a device 102, 202, etc., wishes to access a wallet or other application, the application may be accessed in the corresponding location in the cloud, and desired or required information can be pulled by the device 102, 202 from its cloud-based storage location and relayed to payment card device 500 for use in POS or other transaction communications.

As will be understood by those skilled in the relevant arts, any communications, payment, and/or other protocols suitable for use in implementing the various aspects of the disclosure may be used. These include, for example, GSM, EMV-GP (Europay-MasterCard-VISA Global Platform), and other protocols. Global Platform is a platform/organization that has provided standards used to manage applications (e.g., Java Card Applets) on cards. It includes authentication schemes and authorization of additional "security domains", that may manage applications. EMV is a standard created by Europay, MasterCard and VISA for interoperability of smart cards, including SEs stored on SIM cards, on payment card device 500, etc., and POS (point of sale) terminals.

A secure element can, for example, comprise encrypted hardware (e.g., a suitably-configured SIM card), public/private keys and other cryptographic elements, and suitable communications devices for communication, through, for example, a controller of a device 102, 202, with an NFC or other communications system of the device 102 and thereby with merchant POS systems 114, servers 112, etc.

Figure 2:
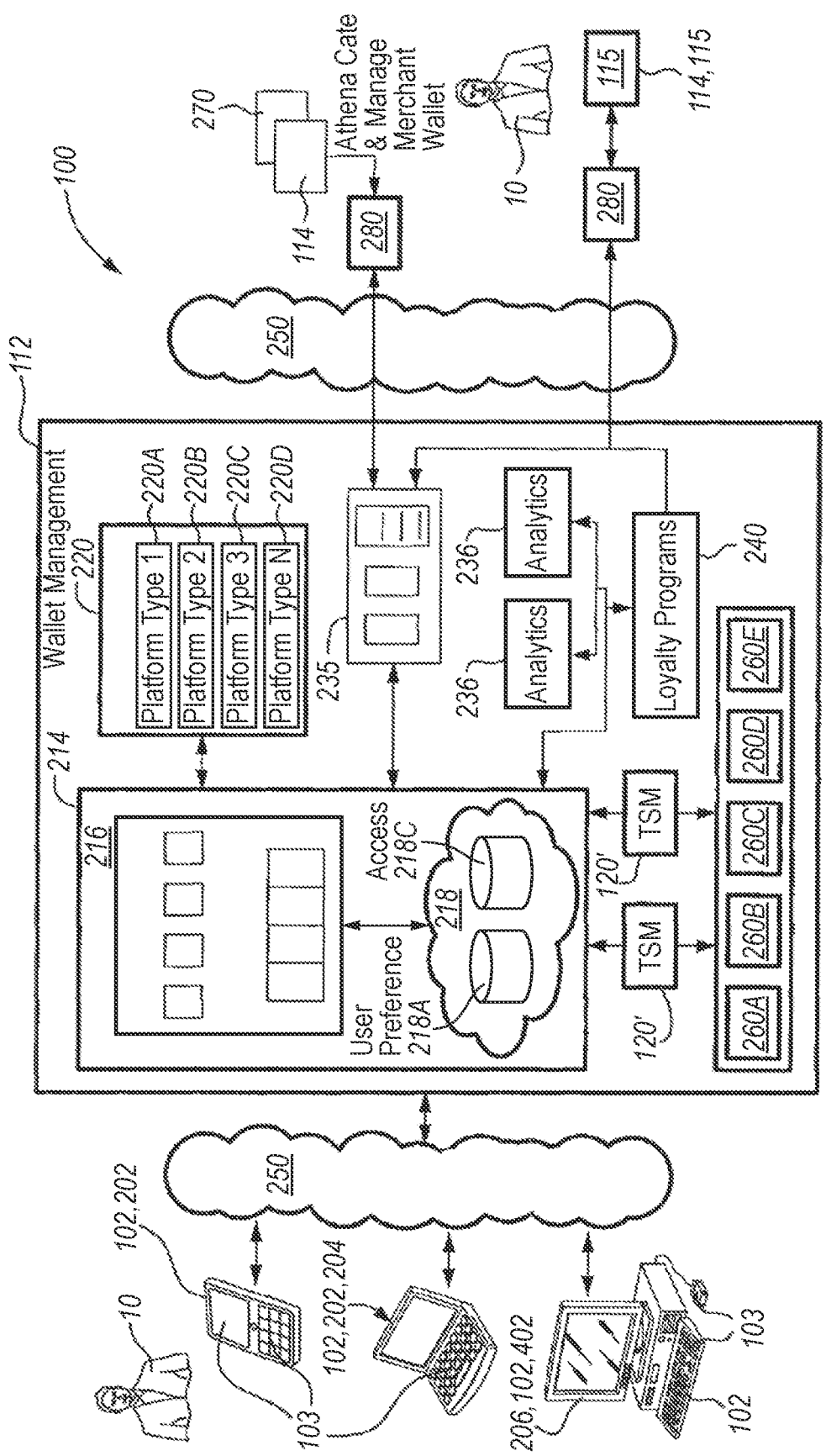

FIG. 2 provides a schematic diagram showing further examples of systems 100, and processes, suitable for implementing secure data processing and storage in accordance with the disclosure. The embodiments shown and described in FIG. 2 are consistent with those of FIG. 1, and provide further details of various embodiments 100A, 1006, etc.

In the embodiment(s) shown in FIG. 2, a payment transaction or other processing system 100 in accordance with aspects of the disclosure comprises an application server 112, such as a financial institution server comprising secure online banking or other payment account management module 214, comprising an online secure financial account and information system 216, which can for example be implemented by or on behalf of one or more banks or other financial institutions (FIs) and which can comprise one or more secure data bases 218; a client application/customer wallet management application 220, for managing virtual wallets and/or data processing applications which can wholly or partially reside on any desired client or customer device(s), including for example any one or more client laptop 204, desktop 206, or other mobile or stationary computers 102, 202, and/or any mobile devices such as palmtop, tablet, or other mobile communication device(s) 202, which can include various module(s) and/or application(s) for implementing or otherwise interacting with any of a very wide variety of financial and other data processing transactions, including debit, credit, and/or loyalty transactions; one or more rewards or other loyalty program servers 240, which may be administered by the same and/or other FIs, third-party program administrators, etc.; hardwired and wireless security and over-the-air (OTA) communications infrastructure 260; and a wide variety of third party partner systems, including for example merchants and cardholders 214, 270. As will be understood by those skilled in the relevant arts, once they have been made familiar with this disclosure, any or all of components 112, 214, 216, 220, 240, 260, 114, 270, etc., may be implemented in a very wide variety of forms and combinations, and may be controlled by a wide variety of entities, including FIs such as banks, merchants, consumers and other customers and clients, and third party service providers.

For example, application server(s) 112 may host or otherwise enable or provide any type(s) of data processing consistent with the purposes disclosed herein. These can include, for example, banks, brokerages, merchants, credit card, and other financial institutions, and other processors of secure financial transactions; secure text, image, or other media generation, storage, presentation, or control service providers; social media application servers, auctioneers and other commercial sites, etc.

Server(s) 112 in the form of online banking or other payment account management service providers can include modules 214, comprising online secure financial account and information system(s) 216, which can for example be implemented by or on behalf of one or more banks or other financial institutions (FIs) and which can comprise one or more secure data bases 218.

Client application/customer wallet management application(s) and/or server(s) 220 can provide any execution, support, data storage, or other functions useful in hosting or otherwise managing virtual wallets and/or data processing applications which can wholly or partially reside on any desired client or customer device(s).

Server(s) 112, 214, and user devices such as laptop(s) 204, desktop(s) 206, and/or other mobile or stationary computers 102, 202, and/or any mobile devices such as palmtop, tablet, or other mobile communication device(s) 202, can be implemented in any desired form, including any suitably-configured special or general purpose data processing devices of any type.

Applications 104 managed or implemented at 102, 106, 116, 214, 216, etc., can be supported by any of a wide variety of third- or fourth-party service providers. For example, in the case of online and/or POS purchase transactions, third-party loyalty managers or service providers can provide or support suitably-configured data processing.

Secure memory(ies) 218 administered or otherwise managed by servers 112, 214, etc., can store any desired or required sensitive information, including personal information, preferences, and other data associated with users 10, etc., and account information associated with personal and/or business payment, savings, rebate accounts, etc.

Communications via hardwired and/or wireless network(s) 250 can be provided in any suitable form, using any suitable protocol(s), etc. In the context of a system such as that shown at 100 in FIG. 2, security and over-the-air (OTA) communications infrastructure(s) can be provided by any suitably-configured servers or platforms 260.

OTA and other communications (sub)systems 260, wallet management application(s) 220, and other components of system(s) 100 can be configured to support multiple hardware and software systems. For example, specifically-configured wallet management components 220A-220D, TSM interfaces 120', and communications components 260A-260E can be configured for communications with various hardware devices, including for example Apple, Samsung, Blackberry, Nokia, and other smartphones; SE in the forms of SIM cards, SD cards, etc; and other devices in accordance with GP, GMS, 3G, and other communications protocols.

For example, a suitably-configured wallet manager application 220 can be controlled by a user 10, for purposes of setting up an account with any one or more financial institutions, accessing an account to complete a payment transaction or down-load a pre-paid "card present" payment, token, etc., by accessing a suitably-configured user interface (UI) via input/output device(s) of a suitably-configured user device 102, directly or through online-banking application(s) 216, etc., for purposes of providing, for example, (a) Common and therefore more efficient user experiences across a number of financial institutions (by accessing sub-applications 220A-D, etc.);

(b) Selection and lifecycle management of desired virtual/physical wallets from a defined or definable list ("physical" wallets meaning, in this context, independently-administered account information stored on SEs and other device(s) 102 provided by smart-phone and other OEMs; "virtual" wallets in this context including data sets administered by payment account holders such as banks, credit card, and/or loyalty institutions);

(c) Preference setting and review of selected or otherwise eligible wallets, deletion or de-registration of wallet(s), nicknaming of accounts and account attributes; notifications;

(d) Selection and management of instruments, including for example provisioning of credit, debit, reward, and/or loyalty accounts;

(e) Setting profile and/or other user preferences;

(f) Accessing and utilizing other value-added (ancillary functions offered by the hosting FI, etc.)

(g) Interfacing with third party service providers, etc.

(h) Setting and recovery of user identifiers and authenticators, including for example personal identification numbers (PINs), passwords, etc.; License and/or other consents or acknowledgements by a contracting user 10;

(j) Accessing service center or other help/contact information;

(k) Access, set up, and use pay and tap and peer-to-peer (P2P) transfer functions;

(l) Loyalty program setup and redemption, etc.

In embodiments such as that shown in FIG. 2, secure memory(ies) 218 can be provided as 'cloud-based' secure elements including any one or more unified, or physically or virtually separated, secure database(s) 218A, 218C, etc., and can provide:

(a) Logical and or physical secure element functionality similar to, for example, hardware SEs provided in SIM and other fixed and/or removable memory(ies) used on smart phones and other mobile or stationary devices 102. Such SEs can be used to store account identifiers and other information pertaining to credit, debit, coupon, reward, and other loyalty accounts associated with a user 10 of an optionally specific device 102;

(b) Encryption and other logical security functionalities;

(c) User accessibility through wallet synchronization and management services and engines 220, etc.;

(d) User, account, and other preferences and user selections, including for example use of nicknames, telephone numbers, and other identifiers for convenient and/or secure user access to account and transaction information;

(e) Synchronization of account and other information across accounts, wallets, etc., associated with various accounts and financial institutions, etc.

(f) Card-present (i.e., pre-paid or pre-authorized) payment or transaction tokens. Such tokens may, for example, be created by allowing a user 10 to access his account an FI and to sequester, segregate, or otherwise identify and optionally set aside pre-authorized payments to be used in later transactions, at the convenience of the user 10;

(g) Redemption and rejection records pertaining to offers, promotions, etc.

In the embodiment(s) of FIG. 1 and FIG. 2, purchaser financial data may be provided to a mobile communication device or other device 102, e.g., for use in initiating or completing a proposed transaction at a merchant POS 114, website 270, etc., by any one or more data prep system(s) such as a purchaser wireless device(s), remote desktop computer(s) operating via one or more on-line banking (OLB) systems, and/or any one or more partner sites operated by financial institutions and/or other service providers. Following receipt by the mobile communication device, such purchaser financial information may be stored in a secure environment such as an SSD logically resident in a cloud-based system operated by a bank or other financial institution or service provider.

As previously noted, particularly advantageous features of systems and methods in accordance with the disclosure is that they may be implemented using any suitable communications technology(ies), including for example any one or more of the internet, the PSTN, or other wired and/or wireless connection, and stored, card readers, NFC devices, bar codes, scanners, Bluetooth devices, etc., in any suitable or desired combinations.

Such communications technology(ies) may be used to transfer or otherwise share data between the various systems components in any desired manner. In some embodiments, for example, as shown in the various figures, an SE, and/or any other components, comprise on- or over-the-air (OTA) capability. In these and other embodiments, transactional and/or other financial data (such as, for example, accounts adapted to receive payment in a transaction) may be provided by the SE to any one or more vendor or merchant point-of-sale (POS) systems, via any suitably secure communications link(s), including the PSTN and/or wireless connections, etc. Merchant POS systems can pass the same and/or other transaction information, including for example data identifying purchased items and/or services, price information, quantity information, etc. to one or more purchaser devices such as a smart phone, SIM card, and/or NFC device.

Ancillary functions such as updates, analytics, etc., to or for any suitable or required components of systems 100, 112, can be provided by update, analytic, and other servers 235, 236, etc.

In various embodiments, purchaser or other processing request device(s) 102 can communicate with cloud-based SE(s) 218, 106, etc., using OTA capabilities to access and otherwise make use of purchaser information, including for example information relating to one or more user payment accounts, in order to complete and/or otherwise advance a purchase transaction. For example, corresponding account balances can be checked, a purchase authorized, funds to be used in payment can be pre-authorized, and appropriate credit and/or debit records created for real-time and/or batch processing. Such processing can be processed by cloud-based SE acting alone and/or in cooperation with one or more third-party systems, including for example one or more financial institutions maintaining or otherwise administering credit and/or debit accounts associated with the purchaser associated with the purchaser device.

Figure 3:
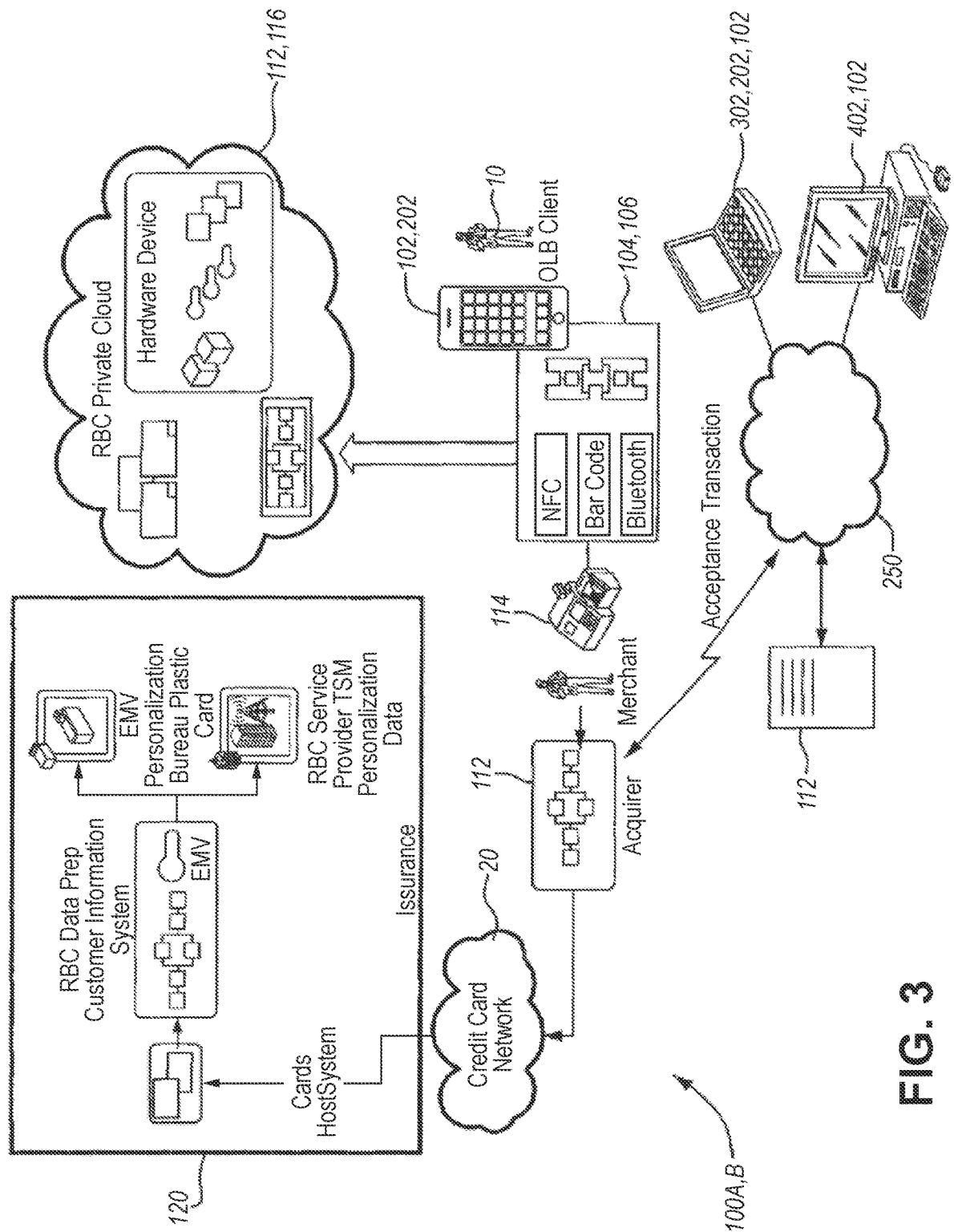

FIG. 3 is a schematic diagram showing an embodiment of a system 10 in accordance with the disclosure, comprising elements of (sub)systems 100A, 1006, of FIG. 1, and associated processes. The embodiment shown and described in FIG. 3 is consistent with those of FIG. 1 and FIG. 2, and provides further details of implementation options.

In the embodiment shown in FIG. 3, a user 10 of a purchaser or other client request device 102 can obtain a pre-paid or other pre-authorized secure card-present token by interacting, via network(s) 250, with TSM(s) 120 and acquirer and FI servers 112, 116, directly or via merchant POS system 114.

Among other advantages, the use of a system 100 such as that shown in FIG. 3 enables a user 10 of a transaction device 102 to acquire a card-present token without requiring an SE on the user's device 102 (or payment card device 500); such a token may, optionally, be stored on behalf of the acquiring user 10 in a cloud-based SE 116 such as one operated by or on behalf of an issuing FI. As noted previously the security of such token may be enhanced by the association, as described herein, of a plurality of secret or otherwise secure identifiers with the token. Such identifiers may, for example, be uniquely associated with the user 10 (whether an individual or entity), a transaction payment account, and the specific device 102 used to acquire the token. Such tokens may, in addition, be used for online transactions (e.g., mobile- and/or other electronic commerce, or "e-commerce" or "m-commerce" respectively). Among the many advantages enabled by systems, methods, and programming products in accordance with the disclosure is that in some embodiments purchasers may be enabled to complete transactions at merchant/vendor POS systems using devices as simple as suitably-programmed NFC devices (such as an NFC handset). This can, for example, eliminate the need for purchasers to acquire, safeguard, or otherwise use SEs, or keep them on their person. This can, for example, reduce opportunities for data and/or identity theft, or other abuse.

In alternative embodiments, as explained more fully below, "card present" and other transactions can be conducted, or otherwise implemented, using SEs provided in the form of encrypted and/or otherwise secure, pre-authorized payment tokens stored on mobile devices such as smart phones, tablet computers, and other PDAs. Such SEs may be provided using dedicated firmware embedded within the PDAs, in removable devices such as SSDs and other forms of SIM cards, and/or any other suitable form, and may comprise all data required to initiate and complete an electronic transaction, or one or more required elements, including for example account identifier(s) and/or pre-authorized purchase amounts.

Among advantages offered by aspects of the disclosure in which such SEs and/or tokens are provided in firmware or other embedded devices, rather than removable devices, in view for example of current communications business practices, is that purchasers, and financial institutions and other account issuers and/or payment processors, can be relieved of sometimes unnecessary or onerous relationships with SE issuers, with additional benefits of reduced costs and system complexity, and improved customer relations. For example, by transferring secure financial data from a SIM on a purchaser's mobile device to other memory on a PDA or a payment card device 500, and/or to secure remote memory devices, dependency of any or all of purchasers, account issuers, and payment processors on mobile network operators, or mobile network carriers (MNOs) can be eliminated or reduced. By transferring such data from memories embedded on mobile devices such as smart phones or tablet computers, dependence of such parties on OEMs and/or handset manufacturers can be eliminated or reduced. By transferring such data from SD cards, risks and inconveniences associated with swapping cards, manipulating card sleeves, distributing cards, low memory capacity, and purchaser confusion can be eliminated or reduced.

Among advantages offered by embodiments in which such SEs and/or tokens are provided on removable devices such as SIM, SD, or other memory cards, is that personalized information associated with one or more particular users, including for example personal identification or authentication codes, may easily be transported from one device to another.

A further advantage of either type of embodiment is that secure financial information (e.g., a purchaser's virtual wallet) can be conveniently available for online (e.g., e- or m-commerce) transactions.

As will be apparent to those familiar with the disclosure, a large number of further advantages are, or may be, enabled by the disclosure.

FIGS. 4A-4E are schematic diagrams showing further embodiments of system architectures suitable for use in implementing secure storage facilities and other components in accordance with the disclosure, and associated processes and information. In each of the embodiments, the illustrated payment systems comprise user payment, transaction, or other communication devices 102, FI or other adjudication systems 110, and third-party service providers such as payment or other application processors 112, TSM and other communications service providers (e.g., telcos) 120, etc.; and in some cases merchant POS or other transaction systems 114.

Each of the embodiments shown in FIGS. 4A-4E further shows mobile banking and/or other data processing application(s) 104, and memory(ies) and SEs 106, 116, and optionally 118. As may be seen in the FIGS. 4A-4E, application(s) 104 and memories and SEs 106, 116, 118 may reside on purchaser device(s) 102. Alternatively, as previously noted In the embodiments shown in FIGS. 4A-4E, a requesting client device 102 is shown in the form of a PDA 202 such as a smart phone or other wireless mobile communications device. An adjudicating server 110 in is shown in the form of an FI system comprising multiple servers, and/or server applications (which may, for example, be implemented physically on any one or more separate server machines, and/or in various virtual combinations single data processing devices), including a mobile banking web server 410; an authentication server 412; backend systems 414 configured to provide encryption services and other functions ("Backend Systems); and a support services provider 416 configured to provide hardware services module (HSM) functions, encryption key management services (KSM), TSM functionality; and account management services. Third party service provider system(s) 120, 122 "Partners", comprising, e.g., communications and payment/transaction processing service provider system(s), provide telecommunications, transaction processing, and any other required/desired third-party service functions.

Among other features, in the embodiments shown in FIGS. 4A-4E:

(104A) represents a general banking or other payment or data processing application executable by the PDA 202 or other client system 102, operable to, for example, enable access to wallet application (104) and to provide other remote banking functions, to enable a user to access general banking and/or other payment processing application executable through use of PDA 102, 202, and input/output devices 103;

(104B) represents a wallet application executable by the PDA to enable access to one or more payment or other financial accounts associated with the PDA, or a user or a manager or other administrator thereof. Application 104B can be implemented, for example through a user interface layer, or application, of a wallet application executable by the PDA;

(432) represents a token manager provided through the FI 110 from, for example, an application/integration tier, to interact with the FI, via telecoms and other TSMs 120 as needed or desired, to preload or otherwise provide the PDA with encrypted or other virtual payment tokens, and to facilitate loading/access of such tokens into the SE application (106, 116) for use in payment or other data processing transactions. Such a manager 432 can be configured to reduce or eliminate transaction network latencies by, for example, working in conjunction with presentation tier token manager (3), and providing EMV tokens and cryptograms across all payment types or instruments for POS transactions.

(116) represents an SE implemented on a SIM card, and/or on other secure and optionally removable memory of the PDA 102, 202, the SE comprising an applet and/or other executable code or data suitable for use in securely generating transaction and other data sets suitable for use in initiating, negotiating, and/or consummating data processes such as financial transactions at, for example, merchant POS devices 114, and/or for otherwise enabling access by a user of the PDA 102, 202 to account information controlled by the FI "Host" 110. As explained further herein, SE 116 can provide memory for storing authentication data representing multiple independent identifiers, or credentials, including for example one or more identifiers associated with each of a user 10 associated with a device 102, the device 102 itself, and account or other application information associated with the application 104 adjudicating server 11, or third party server 120, etc. Both identifiers and secure process tokens such as pre-paid transaction tokens can be stored. Such tokens and credentials can represent or otherwise be associated with a wide variety of accounts or other application-related data sets, including for example, savings, checking, credit, debit, rewards, gift cards, and/or other payment credentials can be stored in an SSD created exclusively for an FI on the SIM card or other secure memory.

(110) represents an authentication or adjudication server configured to authenticate the user 10, PDA "Device" 102, and application or other information such as an account number, and thereby authorize or otherwise enable secure access by the Device 102 to FI services hosted by 110 over the web or other network 250;

(430) represents a mobile application server such as a platform integration server of, or otherwise associated with, the adjudication server 110, adapted to authenticate client device(s) 102, user(s) 10, and other credentials by comparison to known authorized devices 120, and thereby enable secure access by the Device 102 and/or user 10 to FI or other data processing services available through the server 110 over the web or other network 250;

(412) represents a presentation layer of, or otherwise associated with, the adjudication server 110, for banking or other applications provided by the FI;

(418) represents a gateway, such as an XML gateway, configured to serve as an interface between the adjudication server 110 and merchant payment processor services (112, 420) "Card Systems (TSYS)";

(122) Represents a root TSM provided by a third party service provider such as a telco or other communications service provider, configured to provide services such as creation of SSDs and execution of scripts or other instruction sets provided by the SP TSM (416), or otherwise at the request or authorization of the SP TSM (416);

(416) represents a service provider TSM of, or otherwise associated with, the adjudication server 110, configured to, for example, push and/or otherwise make an SE applet (116) available to the PDA "Device," change UUID/passcode and/or other authorization/authentication information associated with user(s) and/or administrator(s) 10 of the PDA 'Device;' and provide and/or otherwise make available to the PDA "Device" updates and/or replacements for data associated with the SE applet (116), banking application (104A), and/or wallet application (104B), etc. SP TSM 416 can further be configured to provide books of records for credit, debit, and/or other accounts used in transactions, provide and/or otherwise manage accountholder and/or other personal data, such as card "embossment" services or management, and execute updates and/or other changes related to transaction accounts or services, etc.; and otherwise interact with TSYS system(s) (420);

(418) represents FI application(s) and/or other functionality(ies) configured for communications between the FI adjudication system 100 and TSYS service(s) (420) and other third party services 112, 114, and including for example telcos and other TSMs 120, 122, including for example a gateway such as an XML gateway.

(420) represents credit card payment and issuance process (TSYS) service(s) configured to provide books of records for credit, debit, and/or other accounts used in transactions, provide and/or otherwise manage accountholder and/or other personal data, such as card "embossment" services or management, and execute updates and/or other changes related to transaction accounts or services, etc. Further functionality provided by a server 420 can include for example maintaining, coordinating, and/or otherwise administering books of records for credit, debit, loyalty, gift, and other payment accounts held or administered by third parties; creation and maintenance of mobile accounts and tokens, creating and/or sending account-holder personal data such as card embossment preferences, etc; and facilitating account updates;

(414) represents FI backend services of, or otherwise associated with, the adjudication server 110, responsible for services such as insertion of protocol requirements into personal data, such as Europay, MasterCard, Visa (EMV) formatting compliance requirements, etc. Such services can, for example, be provided by PTB/CIS applications responsible for inserting EMV or other payment keys into personal data associated with token and/or transaction data sets;

(434) represents a customer support application provided, in the embodiment shown, by a third party service provider and configured to provide, for example, monitoring of commands executed on PDAs, etc.; and (422) represents a web services tier of services 414 used for example to facilitate communications with PDAs 102, 202 at the presentation tier.

Figure 4A:
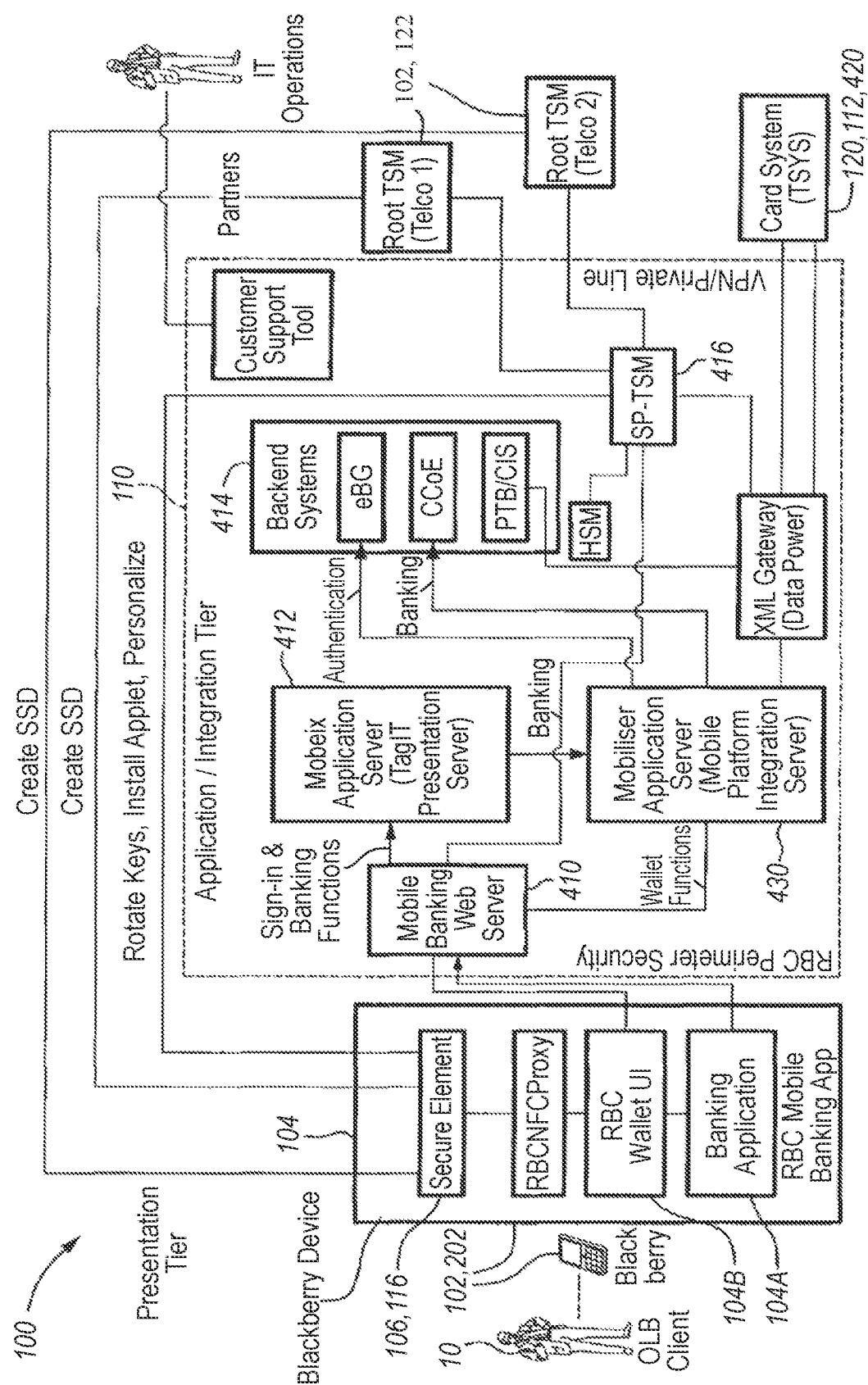
Figure 4B:
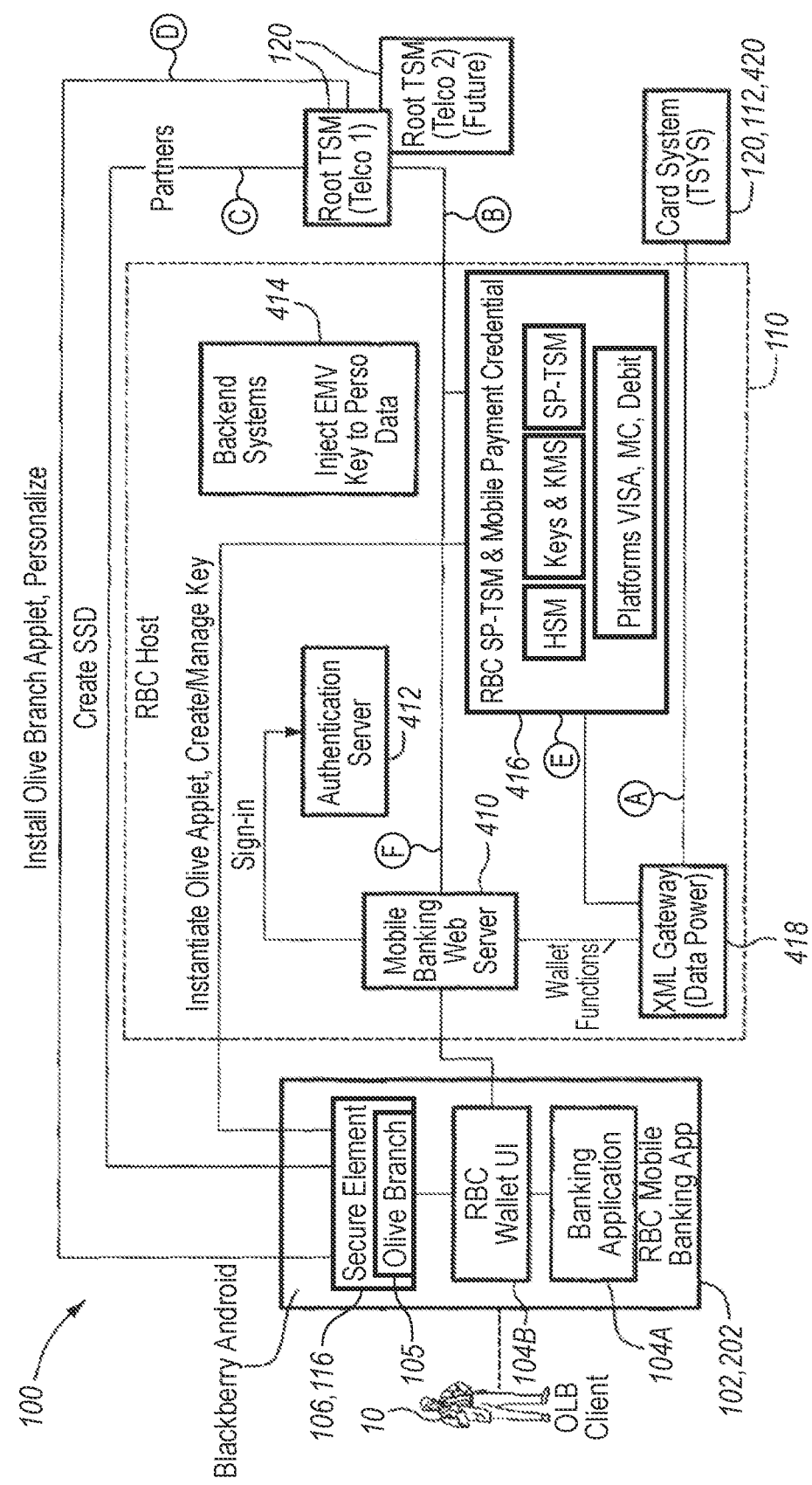
Figure 4C:
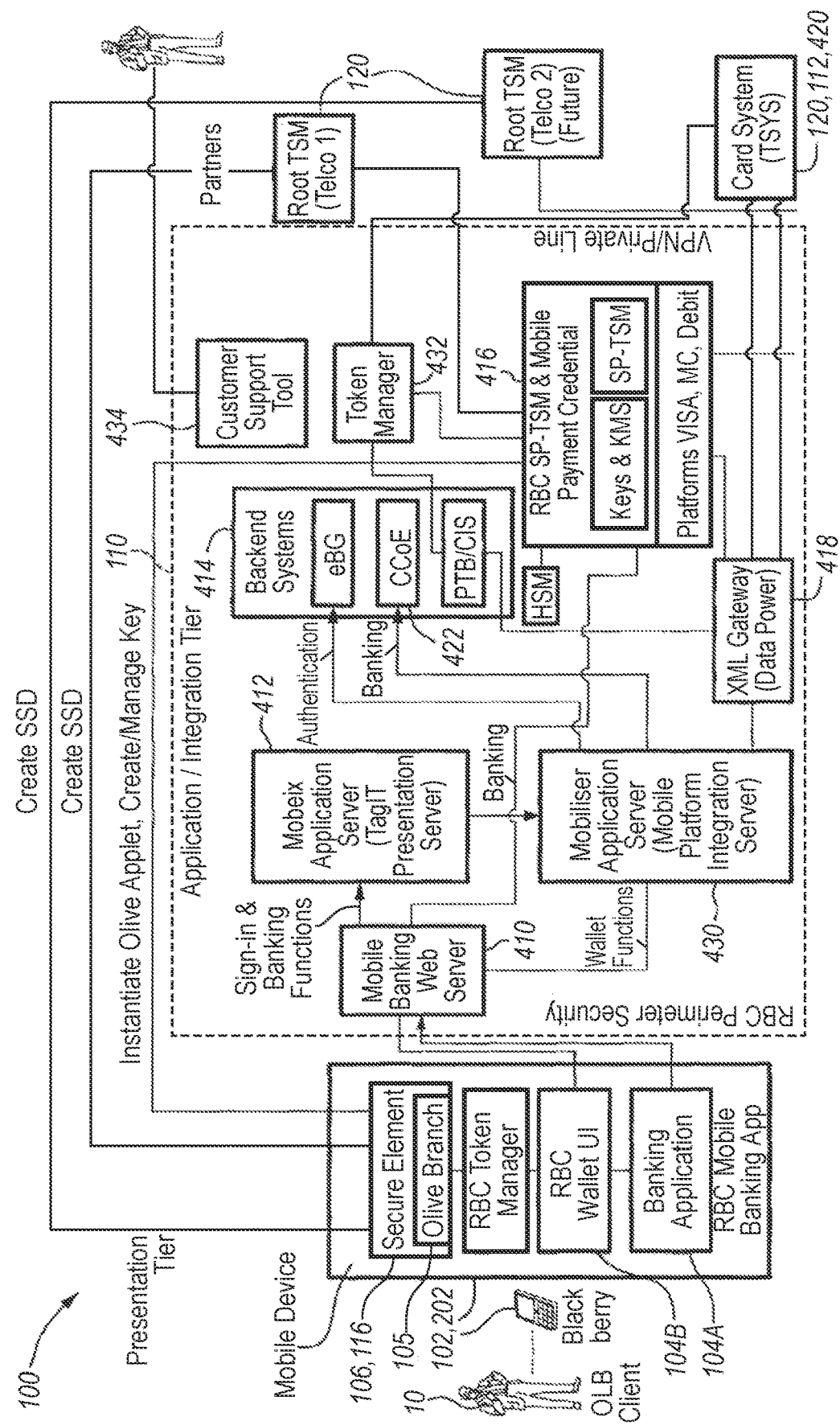

Among other functions, processes performed by systems 100 of FIGS. 4A-4E can include, as shown with reference to FIG. 4B:

at (A), user-initiated and other functions originated at the presentation tier, including for example, requests for personal/account creation or changes, including for example any or all of account holder name, address, password, UUID, and/or payment account information, to be used by, stored by, and/or otherwise associated with a SE applet (116), wallet application (104B), and/or banking application (104A) are passed through the platform integration server (430) to the SP-TSM (416) for execution, in order for example to help ensure that only authenticated users are enabled to perform sensitive functions; the FI application server 410 forwards a request for personal/account creation or change, including for example any or all of user, device, and/or application-related identifiers, such as account holder name, address, password, UUID, and/or payment account information, to be used by, stored by, and/or otherwise associated with a SE applet (116), wallet application (104), and/or banking application (104A) to the SP-TSM (416) for execution;

at or after (B) the SP TSM (416) generates a request for the Root TSM (120) to execute any actions needed to implement the request; including for example generation of an SSD and execution of any required scripts, and causes the request to be forwarded to the Root TSM (120);

at (C) the Root TSM (120) executes any necessary actions required to implement the request generated at (B) on the PDA "Device" 102, 202, by for example creating or updating an SSD comprising data representing all desired independent identifiers on the SE (116);

at (D) the SP TSM 416 installs the SE applet (116), and performs and required or desired personalization functions, by for example causing the Root TSM (120) to execute suitable instructions;

at (E) the SP TSM 416 provides key management and optionally other desired encryption functions; and at (F) device eligibility checks and polling for command execution status are performed, as for example by the Root TSM 120.

In the architectural embodiments shown in FIG. 4A-4E, a user payment device level ("Presentation Tier") of functionality can be provided for implementation on a PDA such as a smart phone or other wireless mobile communications device 102, 202, or a payment card device 500. An application/integration tier implemented by for example an FI server system 110 can be provided using multiple servers, and/or server applications 410, 412, 414, 416, 418, 430, etc., (which may, for example, be implemented on any one or more separate server machines, or on a single data processing device), including a mobile banking web server 410; a Mobile Platform Integration Server "Mobiliser Application Server" 430, a token manager 432; a customer support tool 434; backend systems 414 configured to provide encryption services and other functions ("Backend Systems); and a support services provider 416 configured to provide hardware services module (HSM) functions, encryption key management services (KSM), TSM functionality; and account management services (Platforms). Third party service provider system(s) 120 "Partners" or "External Vendors" provide a variety of support functions, including for example communications and payment/transaction processing services, customer support, etc., as well as any other required/desired third-party service functions.

Figure 4D:
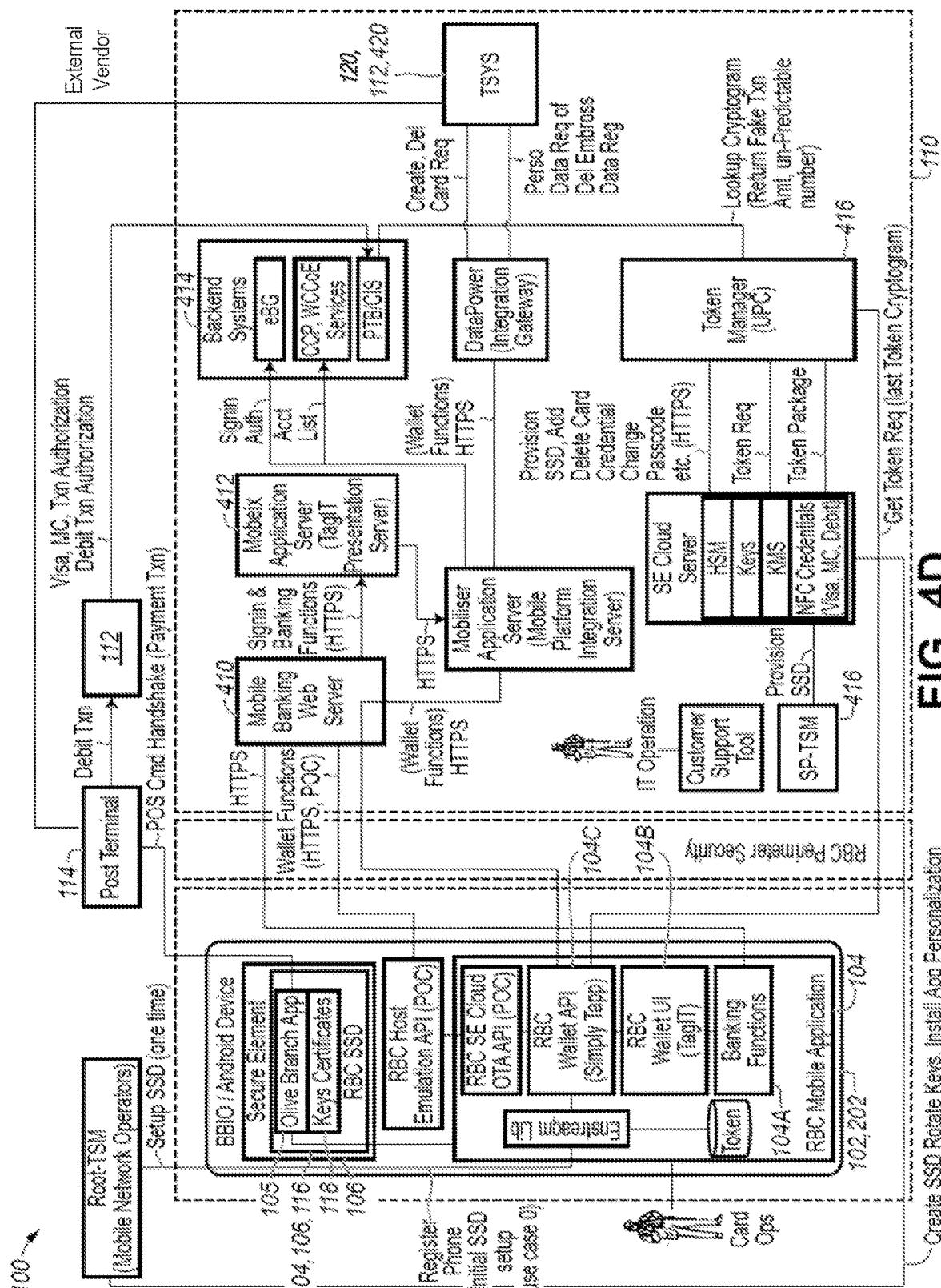

As will be understood by those skilled in the relevant arts, and as shown for example in FIG. 4D, FI and/or other payment servers, or systems 110 in accordance with embodiments have, among other features, the ability to virtualize operations of a SIM-based Secure Element (SE) 116, and can be configured to support all suitably-compatible payment schemes, including automated clearing houses (ACHs) and a wide variety of others. Such payment servers/systems can manage general and cryptographic processes in the HSM. Sensitive applications and application data can be stored and secured in firewalled and and/or other secure issuer environments; any and all data may be segregated within any one or more desired databases, using the most sophisticated and secure database systems software(s).

Services provided by such servers/systems can include:
(a) Hardware based Cryptographic operation using HSM servers 416, etc.;
(b) Key management operations;
(c) Generation of payment credentials QVSDC, MSD DCVV, etc., for all card/payment types, including Debit, Gift, Visa, MC and/or others.

Figure 4E:
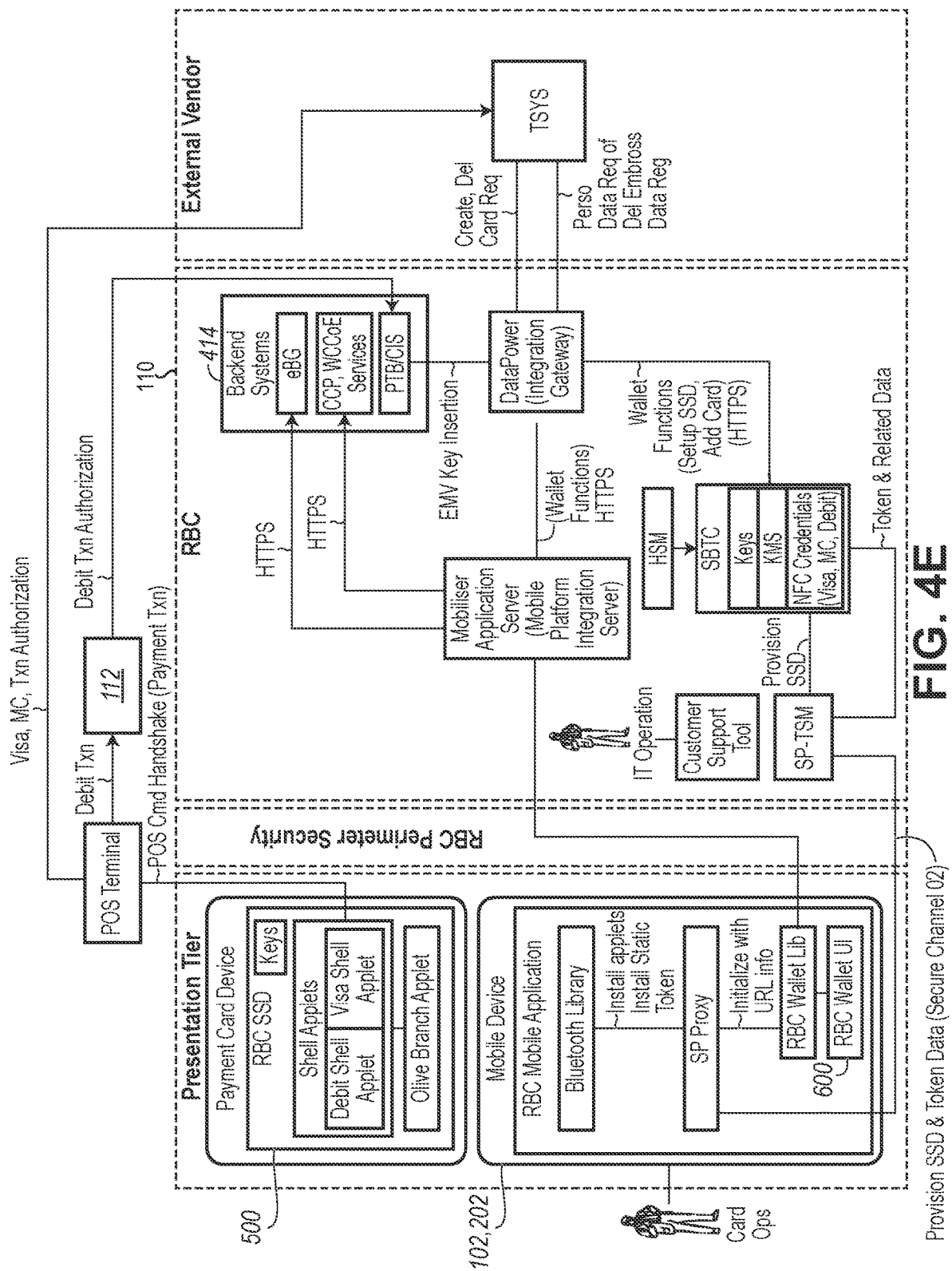

Some of the terms used in FIGS. 4A-4E, and others, include:
OLB On-line banking
OTA Over the air, e.g., wireless
TSM Trusted service manager
SP-TSM Service provider TSM
TSYS Merchant and/or card payment processor system
CCoE or CCCoE Common component center of excellence
JSR Java specification request(s)
PCI Payment card industry
RBC Financial institution and/or other financial services provider
Telco Telephone and/or other communications service provider As shown in FIG. 4E, in some embodiments, part of the Presentation Tier may be implemented in a mobile user device 102, 202, and another part of the Presentation Tier may be implemented in a payment card device 500. In such embodiments, mobile user device 102, 202 and payment card device 500 operate in concert, in manners detailed below, to perform various payment processes.

With reference to FIG. 4E, the Presentation Tier includes a mobile device 102, 202 that can load payment tokens into the secure element of a payment card device 500. The mobile device 102, 202 includes the aforementioned electronic wallet management application 220 with secure keys for secure communication. The wallet management application 220 can also manage a cache and select/set an application identifier (AID). The wallet management application 220 can be utilized for initial payment card and payment token setup, account management, device messaging, and so on.

Payment card device 500 can connect to a merchant POS terminal 114 for payment processing, such as exchanging payment commands and token data. Merchant POS terminal 114 can connect to a payment processor to process and authenticate the transaction as described above.

Mobile device 102, 202 can connect to remote server system 110 via a perimeter security. Remote server system 110 can provide a secure cloud payment service, for example. Remote server system 110 can include a mobile banking web server for secure applications and signing and banking functions using mobile device 102, 202 and its electronic wallet management application 220. Remote server system 110 can include a token manager to provision payment tokens to mobile device 102, 202. Mobile device 102, 202 can exchange an SSD with the remote server system 110 for provision of payment tokens. Remote server system 110 can connect to various external systems to validate transactions and perform secure or cryptographic processes.

Figure 5:
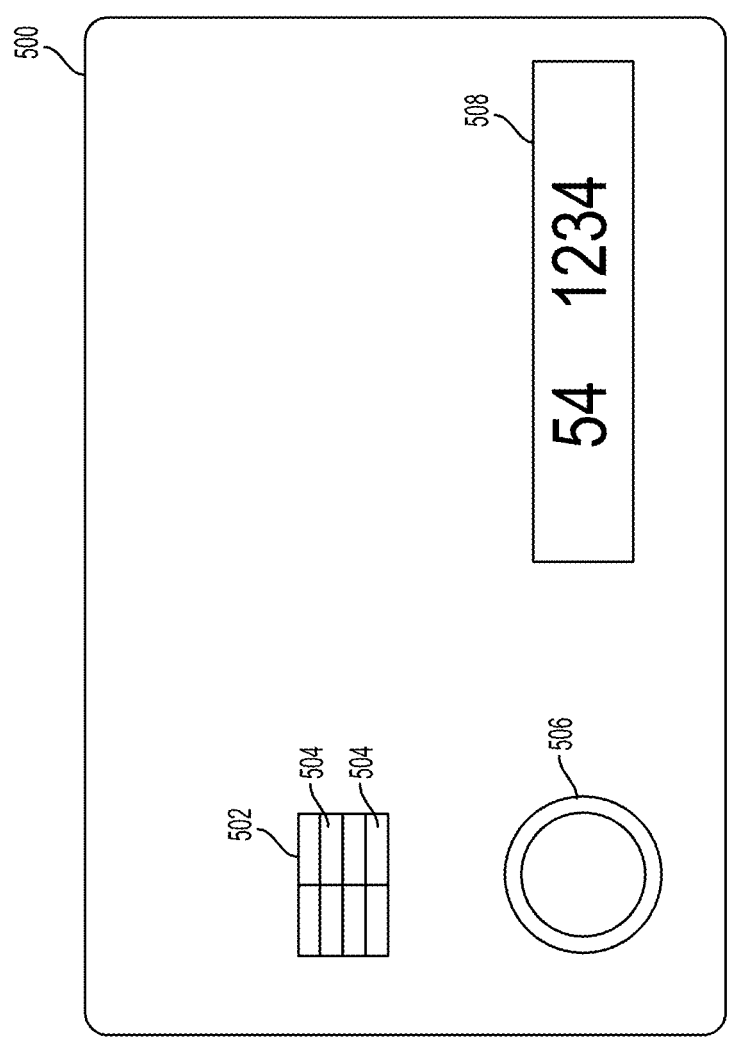
FIG. 5 is a front view of a payment card device in accordance with an embodiment.

FIG. 5 is a front view of payment card device 500, in accordance with an embodiment. As depicted, payment card device 500 is substantially rectangular in shape with slightly rounded corners, resembling a conventional payment card (e.g., a credit card of a debit card). Payment card device 500 includes a smart card module 502 with a plurality of contacts 504, which may be used to establish electrical communication with corresponding contacts of a merchant point-of-sale terminal (e.g., terminal 114) or an automated teller machine (ATM).

Payment card device 500 also includes a button 506 for receiving input signals from a user 10. In the depicted embodiment, button 506 is a push button with a low profile, e.g., having a thickness of approximate 0.3-0.8 mm or less. As shown, button 506 is round with a diameter of approximately 8 mm. Of course, in other embodiments, the type, shape and size of button 506 may vary. Also, the number of buttons may be increased. In some embodiments, button 506 may be replaced by a touch-sensitive input interface such as a resistive touch interface or a capacitive touch interface.

Payment card device 500 also includes a display interface 508 for displaying output signals to the user. In the depicted embodiment, display interface 508 includes an electronic ink (e-ink) display that displays text or graphical content. Conveniently, an e-ink display, even when unpowered, continues to display content that drawn onto the display when it was last powered. In other embodiments, the e-ink display of display interface 508 may be replaced with or accompanied by a liquid crystal display (LCD) or light-emitting diode (LED) display.

In the depicted embodiment, device 500 has dimensions substantially similar to a conventional payment card. Conveniently, this allows device 500 to be used with conventional merchant POS terminals or ATMs that expect a payment card to be inserted into a fixed-size slot. This also allows device 500 to be carried by a user in a wallet or with card slots sized for standard payment cards. As depicted, the dimensions of device 500 are approximately 85.6 mm (width)×53.98 mm (height)×0.84 mm (thickness). In some embodiments, device 500 may have width and height dimensions substantially compliant with one of ID-1 or ID-000 of the ISO/IEC 7810 standard.

Payment card device 500 is formed by lamination to provide plastic layers sandwiching and adhered to a printed circuit board (PCB). The lamination provides payment card device 500 with a hand-feel and rigidity similar to a conventional payment card.

Figure 6:
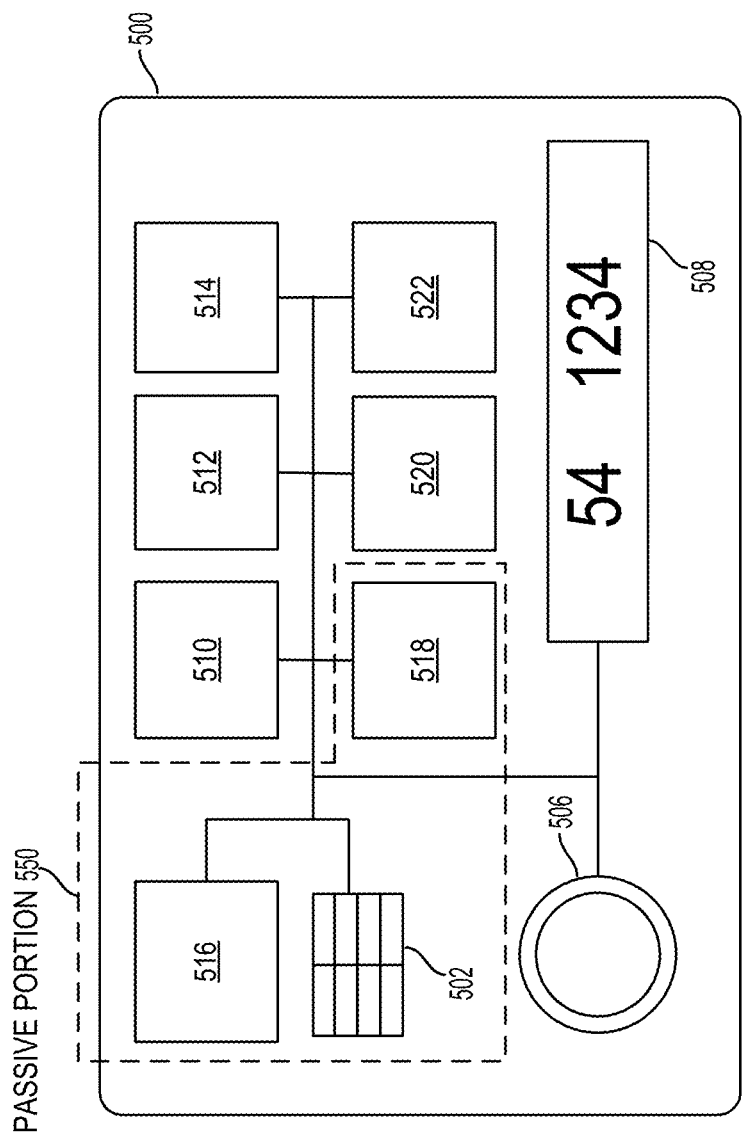
FIG. 6 is a schematic diagram of components of the payment card device of FIG. 5, in accordance with an embodiment.

FIG. 6 schematically illustrates further components of payment card device 500, in accordance with an embodiment. As shown, payment card device 500 additionally includes a processor 510, a battery charger 512, a battery 514, a secure element 516, I/O interfaces in the form of an NFC subsystem 518 and a Bluetooth subsystem 520, and a memory 522.

Processor 510 may be any type of processor, such as, for example, any type of general-purpose microprocessor or microcontroller (e.g., an Intel™ x86, PowerPC™ ARM™ processor, or the like), a digital signal processing (DSP) processor, an integrated circuit, a field programmable gate array (FPGA), or any combination thereof. Processor 510 can execute instructions in memory 522 to implement aspects of processes described herein.

Memory 522 may include a suitable combination of any type of computer memory such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), flash memory or the like. Non-volatile portions of memory 522 may include firmware for controlling the operation of payment card device 500, which may be updated from time to time, e.g., by Bluetooth transmission from mobile device 102, 202.

Secure element 516 is a tamper-resistant, limited-access storage environment for sensitive data and other information, such as payment tokens, payment credentials, or cryptographic data and programming structures. In some embodiments, secure element 516 may include a secure element chip from STMicroelectronics (Switzerland) or NXP Semiconductors (Netherlands). In some embodiments, access to secure element 516 at payment card device 500 may be restricted to processor 510 and NFC subsystem 518. In some embodiments, secure element 516 can be integrated with one or other of processor 510 and memory 522.

As detailed below, secure element 516 can store data and code corresponding to a plurality of payment cards (e.g., credit cards or debit cards), and a package of data and code for a particular payment card may be referred to herein as an "applet". In accordance with a first type of applet, an applet for a particular payment card may include a plurality of consumable payment tokens which are each consumed when used to effect a payment, i.e., the tokens are one-time-use payment tokens. In accordance with a second type of applet, an applet for a particular payment card may include a generator for tokens or other data for effecting payment. For example, such an applet may generate an authorization request cryptogram (ARQC) using data stored in secure element 516 and EMV rules. In some embodiments, payment card device 500 may be provisioned with a combination of the first and second applet types.

Battery 514 supplies power to other components of payment card device 500. In the depicted embodiment, battery 514 is a low-profile rechargeable Lithium-ion battery with a capacity of approximately 30 mAh. This capacity allows payment card device 500 to operate in "idle" mode (detailed below) for a duration in excess of one hundred hours. During typical use, including periods of "sleep" mode operation, battery 514 may remain charged for up to one year. Other types and sizes of rechargeable batteries may also be used, and the capacity of battery 514 will vary accordingly. Battery 514 is interconnected with a battery charger 512 and may be charged thereby. Battery charger 512 may be an radio frequency charger, allowing battery 514 to be recharged wirelessly. In some embodiments, battery charger 512 may draw power form an external power source via conductive contacts 504 to charge battery 514.

NFC subsystem 518 enables NFC communication between payment card device 500 and another device such as merchant POS terminal 114. For example, payment card device 500 may receive payment requests, and may transmit payment tokens by way of NFC transmissions through NFC subsystem 518. NFC subsystem 518 may include a suitable combination of an NFC chip and an NFC antenna.

Bluetooth subsystem 520 enables Bluetooth (e.g., Bluetooth Low Energy) communication between payment card device 500 and another device such as mobile device 102,

202. For example, payment card device 500 may receive data reflective of new payment tokens by way of Bluetooth subsystem 520. In some embodiments, payment card device 500 may also receive data reflective of firmware updates by way of Bluetooth subsystem 520.

Figure 7:
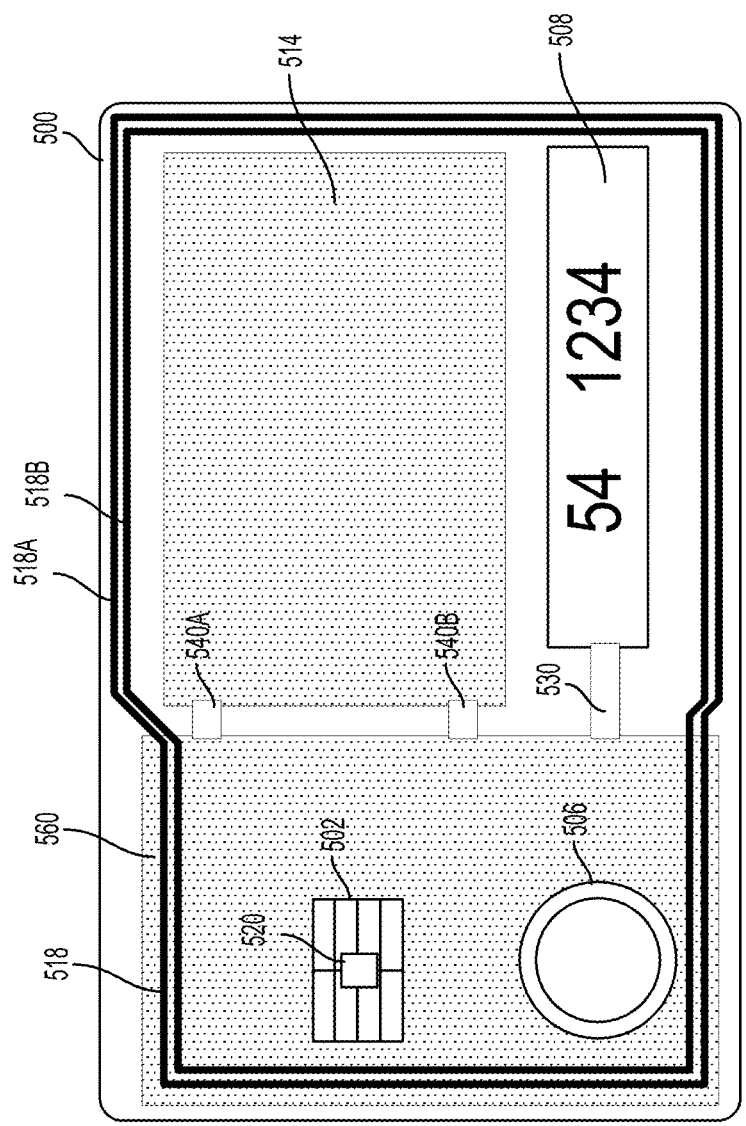
FIG. 7 is a schematic diagram showing the layout of certain components of the payment card device of FIG. 5, in accordance with an embodiment.

FIG. 7 illustrates the layout of certain components of payment card device 500, in accordance with an embodiment. As depicted, payment card device 500 includes a PCB 560 on which some of the other components of device 500 (e.g., processor, memory, smart card module, etc.) may be placed and routed. In the depicted embodiment, PCB 560 may include a rigid portion, e.g., underlying smart card module 502 and providing rigid support thereto) and a flexible portion (e.g., elsewhere). The flexible portion may be very thin (e.g., approximately 0.1 mm), allowing the overall thickness of payment and 500 to be reduced. PCB 560 may have one or more routing layers.

PCB 560 is interconnected with battery 514 by way of interconnects 540A and 540B. This interconnection allows battery 514 to supply power to other components of payment card device 500, and also allows battery 514 to be recharged (e.g., by charger 512). PCB 560 is interconnected with display 508 by way of an interconnect 530 which may be, for example, a flexible ribbon cable or the like.

As depicted in FIG. 7, NFC subsystem 518 includes an antenna routed around the perimeter of payment card device 500 and include a first portion routed on PCB 560 and a second portion formed using two antenna wires 518A and 518B, embedded in the lamination of payment card device 500.

Continuing to refer to FIG. 7, Bluetooth module 520 includes a Bluetooth antenna placed in an opening in smart card module 502.

Payment card device 500 implements power management functionality to extend the life of battery 514. For example, payment card device 500 may transition between the following three power modes:

(a) Sleep mode—Only the passive portion (see below) of payment card device 500 capable of being powered externally are operable. No power is drawn from battery 114. Display interface 508 (when including an e-ink display) continues to display last-written contents.

(b) Idle mode—Payment card device 500 may be used in manners disclosed herein to effect payment. Button 506 is operable to cycle through available payment tokens and display interface 508 is operable to change displayed contents. Bluetooth subsystem 520 is ready to make a Bluetooth connection to another device.

(c) Active mode—Payment card device 500 is connected by Bluetooth via Bluetooth subsystem 520 to another device, e.g., to a mobile device 102, 202 to replenish available tokens. Optionally, operation of payment card device 500 to effect payment may be suspended.

Payment card device 500 transitions from sleep mode to idle mode in response to any one of (1) receipt of an input signal from button 506, (2) detection of an NFC field, or (3) a Bluetooth Low Energy wakeup signal. Payment card device 500 transitions automatically to sleep mode after a pre-defined period of inactivity (e.g., 30 seconds, 2 minutes, 10 minutes, etc.). Payment card device 500 transitions from idle mode to active mode upon establishing a Bluetooth connection, and back to idle mode when that Bluetooth connection is disconnected.

As depicted in FIG. 6, payment card device 500 includes a passive portion 550 that continues to operate even when the device is in its sleep mode. Conveniently, this allows payment card device 500 to maintain functionality of a conventional payment card when in its offline mode, including when battery 514 is fully depleted. In such case, components in passive portion 550 can draw power through RF induction as part of NFC communication (e.g., from a merchant POS terminal 114) in manners similar to a conventional smart card lacking an internal power source. In this case, payment card device 500 presents a payment token from the last selected payment card to the merchant POS terminal 114 to effect the transaction.

Figure 11:
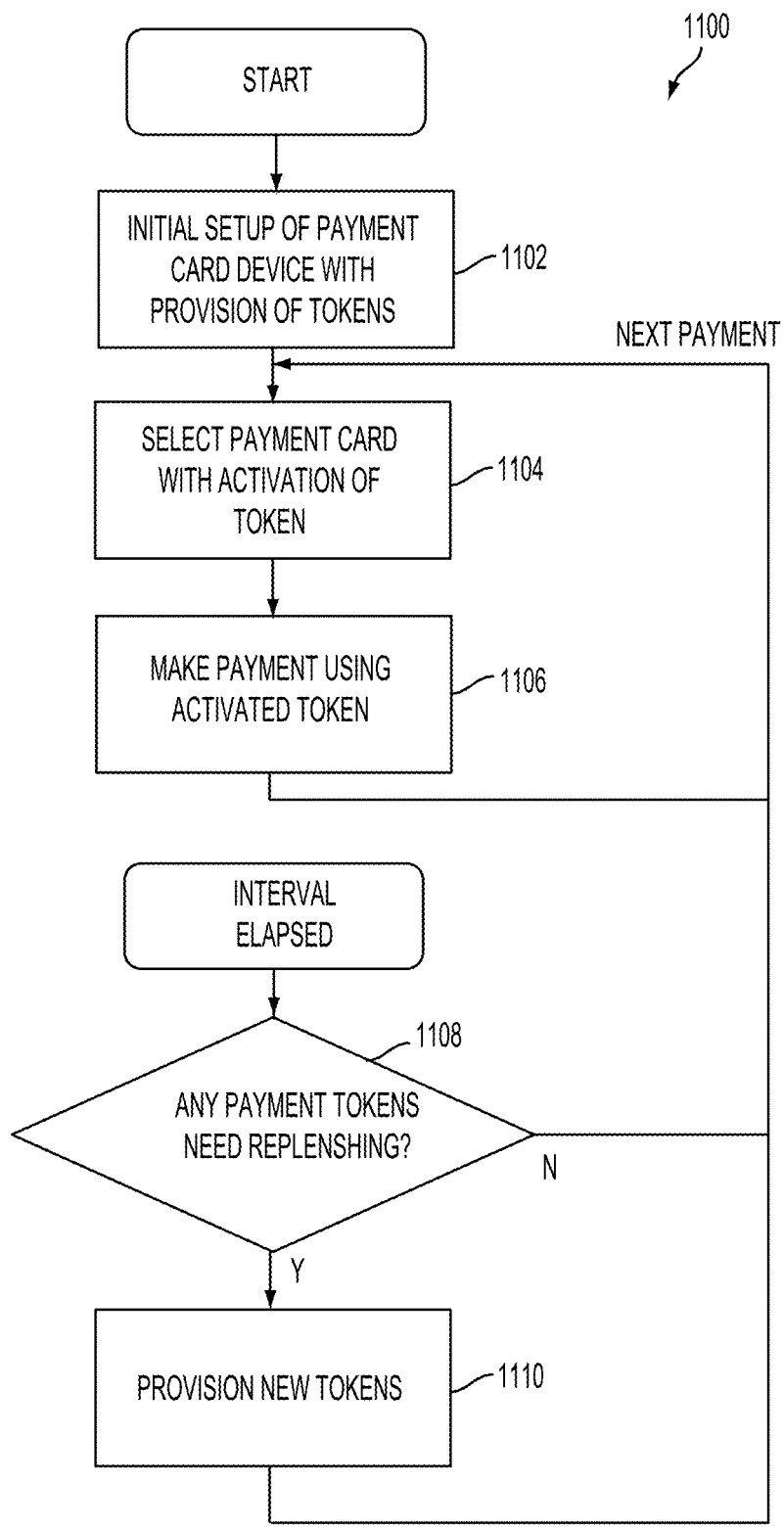
FIG. 11 is a flowchart showing example operation of the payment card device of FIG. 5, in accordance with an embodiment.

The operation of payment card device 500 is further described with reference to the flowchart illustrated in FIG. 11.

Operation of payment card device 500 begins with an initial setup at block 1102 whereby device 500 is provisioned with one or more applets, each associated with one or more payment cards. The applet for each particular payment card may include a plurality payment tokens that can be used to effect payment as a proxy for that payment card, e.g., when payment card device 500 is presented to a merchant POS terminal 114. This enables the applet for a particular payment card to emulate the functionality of the payment card when interacting with the merchant POS terminal 114, e.g., to effect an NFC payment transaction.

In some embodiments, a single applet can include payment tokens for a plurality of payment cards. The applet can thus emulate the functionality of a plurality of payment cards. The applet can select a payment token corresponding to a payment card selected by user 10 for use in connection with a payment transaction.

Initial setup of payment card device 500 may be initiated by a user 10 operating a mobile device 102, 202. User 10 operates the mobile device 102, 202 to establish a secured Bluetooth connection with payment card device 500 (e.g., by pairing the two devices for Bluetooth communication). This causes mobile payment card device 500 to transition to its active mode.

Figure 8:
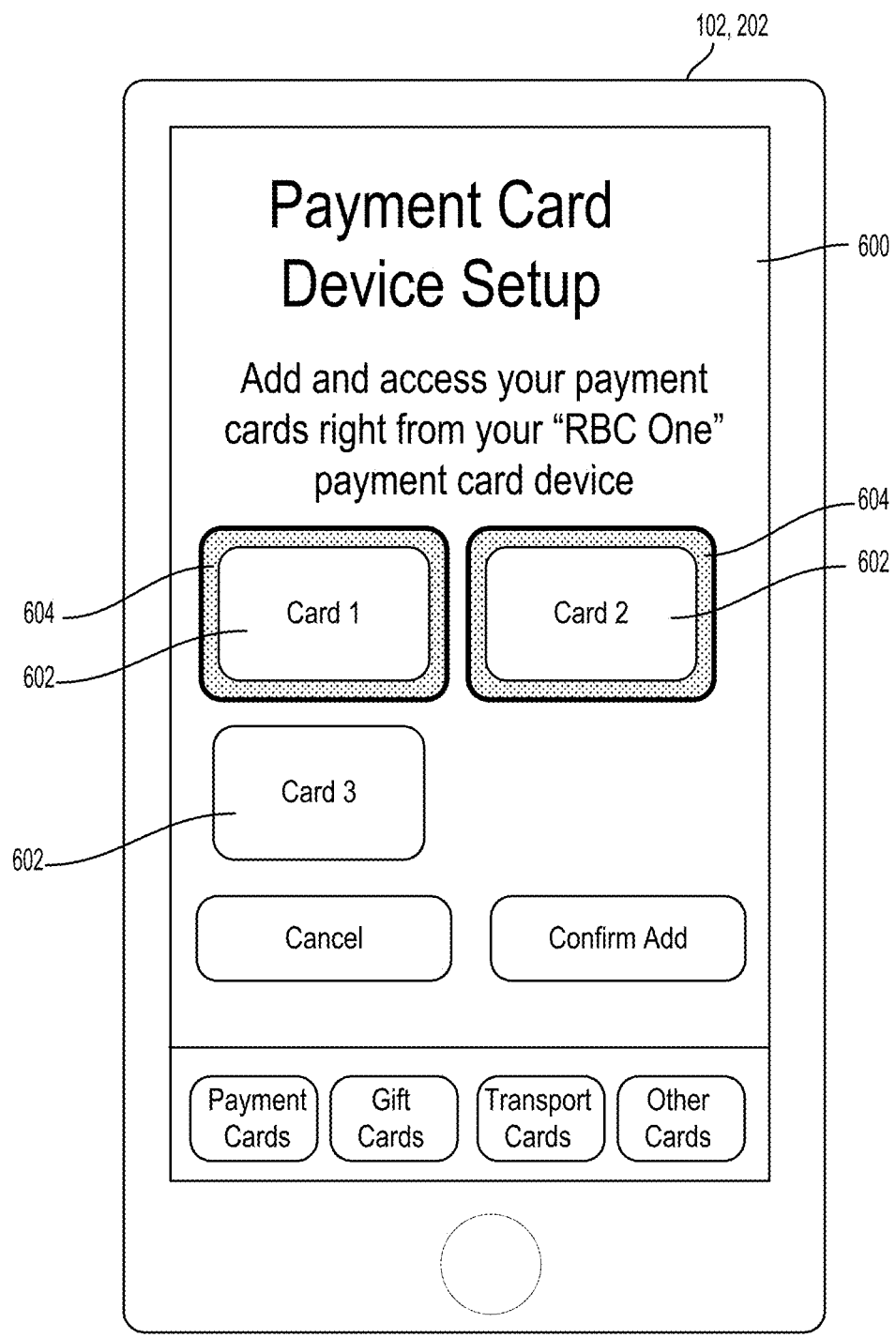
FIG. 8 and FIG. 9 are each a view of a screen of a mobile device with a user interface operable to replenish payment tokens of a payment card device.
Figure 9:
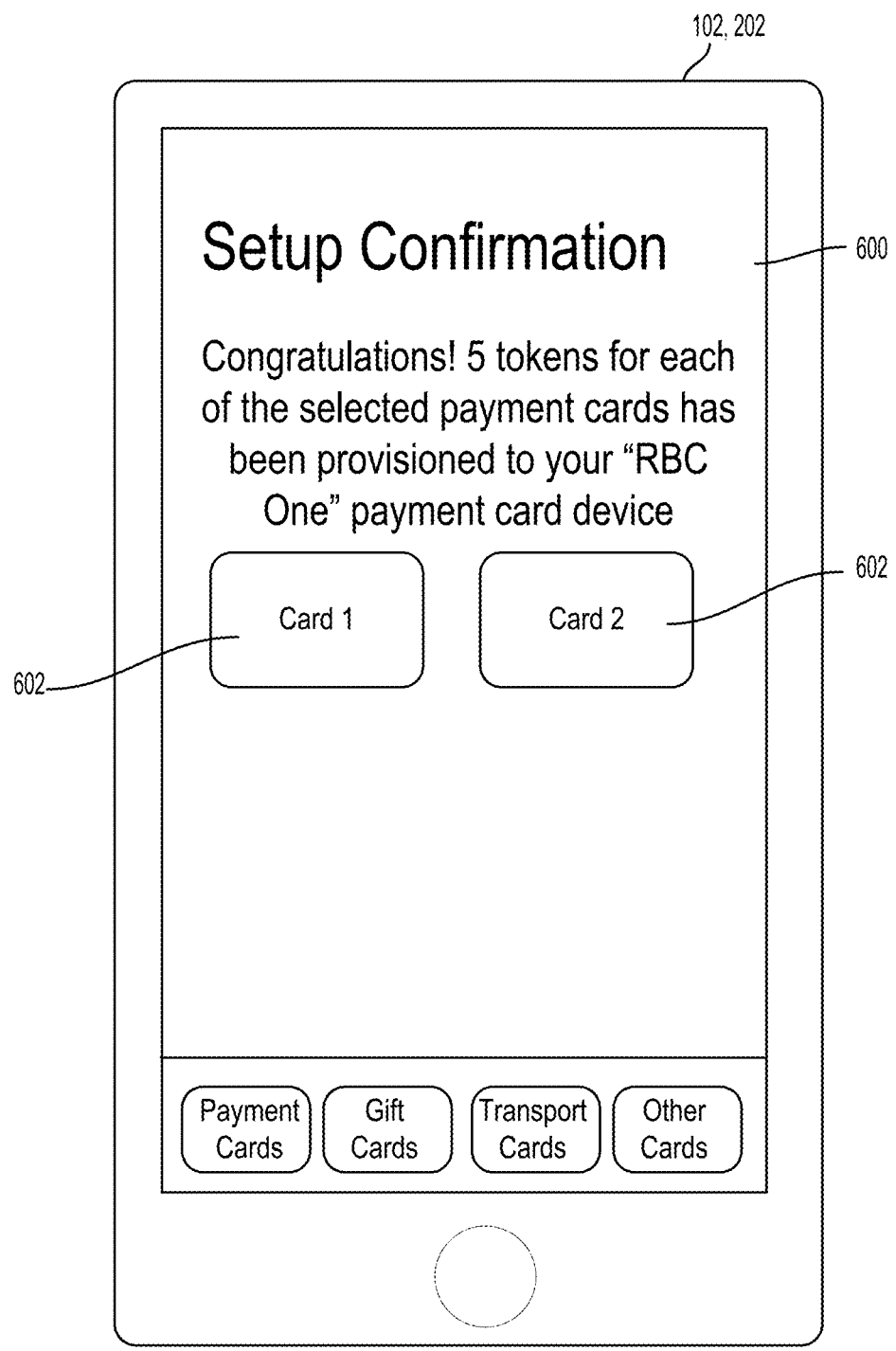

Thereafter, user 10 operates a wallet management application 220 having a user interface (UI) 600 (FIG. 4E, FIG. 8 and FIG. 9). Wallet management application 220 can be operated by user 10 to register and authenticate the user (using a login, unique identifier, and password for example) prior to providing access to other application functions, a local network, network resources, other networks and network security devices.

Referring now to FIG. 8, wallet UI 600 presents a screen displaying a graphical representation of a plurality of payment cards, each of which may be selected by user 10 for loading to payment card device 500. As depicted, wallet UI 600 has presented three payment cards, i.e., card 1, card 2, and card 3, for selection by user 10, and user 10 has selected card 1 and card 2. Once user 10 confirms this selection, for each of the selected payment cards, wallet management application 220 provisions a corresponding applet to payment card device 500, e.g., by secured Bluetooth transmission.

For applets of the first type, provisioning an applet for a particular payment card includes provisioning a plurality of payment tokens that can be used to effect payment using the particular payment card.

Provisioned payment tokens may be generated locally at the mobile device 102, 202 by wallet management application 220 or obtained from a token manager of remote server system 110 (FIGS. 4A-4E) in manners described above. These payment tokens are provisioned to payment card device 500 by way of a secured Bluetooth transmission. The number of payment tokens provisioned is pre-defined (e.g., 5, 10, 50, 100, etc.), and may vary for each user 10, and may vary for each applet. FIG. 9 shows an example screen of wallet UI 600 that includes a confirmation message to user 10 that payment tokens have been successfully loaded to payment card device 500. Applets/tokens received at payment card device 500 may be stored in secure element 516. After payment card device 500 has been successfully provisioned, the Bluetooth connection with mobile device 102, 202 may be disconnected. This causes the payment card device to transition back to its idle mode.

In some embodiments, each of the provisioned payment tokens can be configured to expire after a pre-defined time interval has elapsed. The time interval may be set to a few minutes, an hour, a day, or a month, or even longer. A different time interval may be set for each of the payment cards, and applied to payment tokens provisioned for each of the payment cards. In some embodiments, an applet may delete its expired payment tokens from secured element 516. In some embodiments, an applet may set an indicator in association with an expired payment token to prevent the token from being activated.

In such embodiments, payment tokens need to be replenished by a mobile device 102, 202 periodically, even if the user has not engaged in any transactions. This ensures that payment card device 500 cannot be used to effect payment transactions if separated from mobile device 102, 202 for a period time exceeding the pre-defined expiry time interval, which may improve security.

Figure 10:
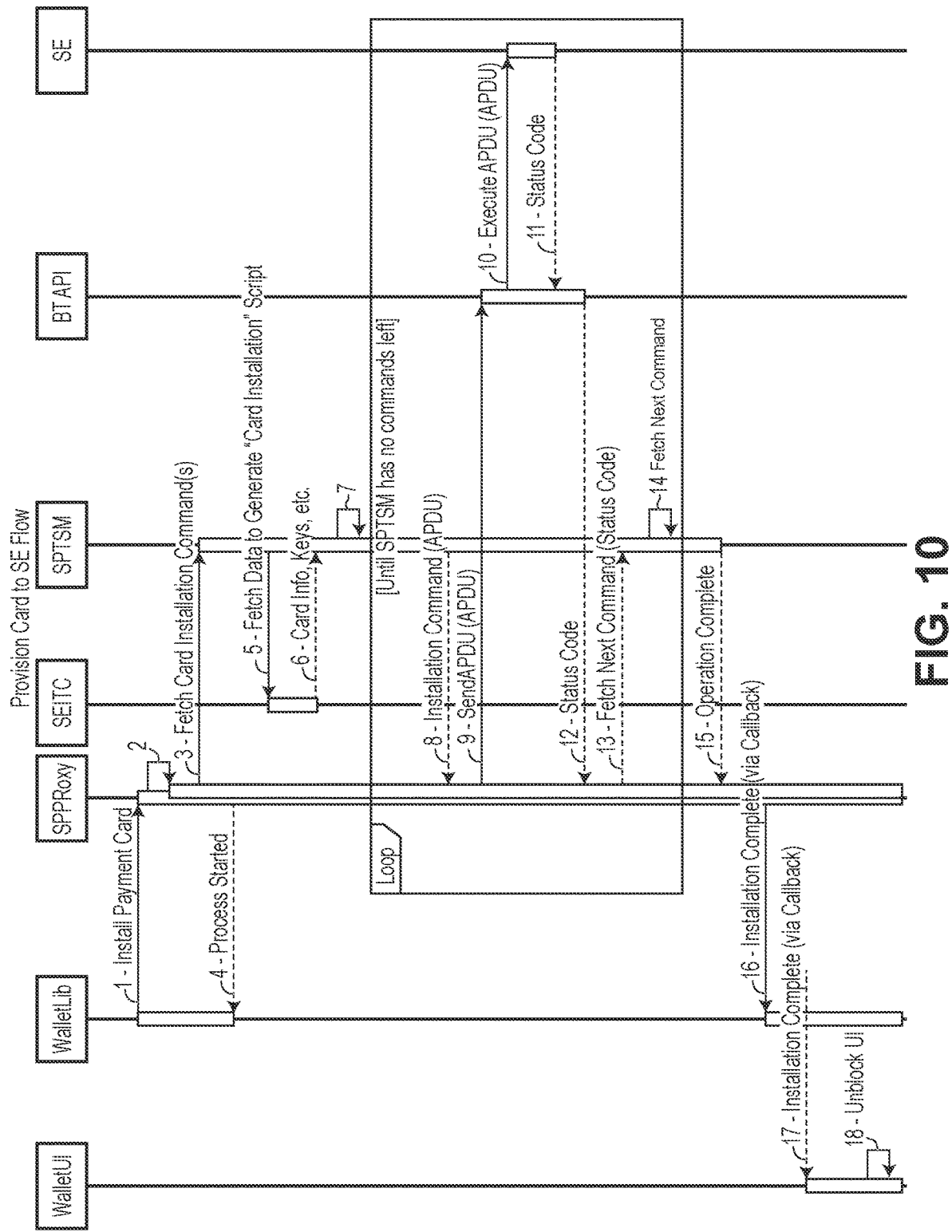
FIG. 10 is a sequence diagram that shows replenishing of tokens of a payment card device, in accordance with an embodiment.

FIG. 10 is a sequence diagram illustrating an example sequence of events for provisioning payment card data to payment card device 500. As depicted, a request is made from the wallet management application 220 (WalletLib) to server system 110 (SPProxy), and then payment card data is provisioned to secure element 516 payment card device 500 (SE) by way of Bluetooth (BT API). Other sequences are also possible.

Referring again to FIG. 11, at block 1104, once initial setup has been completed, payment card device 500 may be operated by user 10 to conduct a payment transaction using one of the payment cards for which an applet has been provisioned to device 500.

To effect payment using a particular payment card, payment card device 500 enables user 10 to cycle through available payment cards (e.g., for which unconsumed tokens are available). In the embodiment of payment card device 500 depicted in FIGS. 5-7, user 10 can cycle through available payment cards by depressing button 506, with each button press selecting the next available payment card. A payment card with no unconsumed payment tokens may be skipped. In some embodiments, a pre-defined order of priority can be established for payment cards (e.g., using wallet GUI 600), and available payment cards can be cycled in this pre-defined order. Optionally, a first press of button 506 (after being unused for a period of time) may select the last-used payment card.

Selection of a payment card causes a descriptor of the selected payment card (e.g., its payment card number, a subset of the numerals in the card number such as the last few digits, or other pseudonym of the payment card (e.g., YOUR AMEX, RBC MC, VISA, etc.) to be displayed by way of display interface 508. This provides visual feedback to the user that a particular payment card has been selected.

At block 1104, an unconsumed payment token associated with the selected payment card is activated. This prepares payment card device 500 for effecting payment using the selected payment card. The process of activating a payment token may vary from embodiment to embodiment. In some embodiments, activating a payment token includes one or more of the following steps: (1) setting an indicator (e.g., a pointer, flag or the like) to indicate a particular payment token to be used for the next payment transaction; (2) setting an indicator to a particular applet or payment card to be used for the next payment transaction; (3) activating a payment token includes copying (or moving) the payment token from a first memory region of secure element 516 to a second memory region of secure element 516; or (4) generating a new payment token for the selected payment card.

At block 1106, when payment card device 500 is presented to a merchant POS terminal 114 for contactless payment (also referred to as "tap" payment), payment card device 500 transmits NFC signals corresponding to the activated payment token to terminal 114. The payment token is then processed by terminal 114 in manners disclosed above.

Payment card device 500 may perform blocks 1104 and 1106 while in its idle mode or sleep mode.

In some embodiments, e.g., when an applet includes payment tokens for two types of payment cards such as a Mastercard and a Visa card, the applet is configured to select one of the payment cards, based on its type, automatically in some situations. One example situation is when a merchant POS terminal 114 does not accept one of the payment card types. In this situation, the applet automatically selects one of the payment cards of an accepted type and activates a payment token for the selected type. This selection may override or obviate the user selection of block 1104. This automatic selection may occur just prior to block 1106. This automatic selection may be performed while payment card device 500 is in its idle mode or sleep mode. When device 500 is in its sleep mode, the applet may execute using power supplied inductively by the merchant POS terminal 114 as part of NFC communication.

Next, secure element 516 is updated to mark the activated token as being consumed. Optionally, the consumed token may be deleted from secure element 516. Payment card device 500 also updates the number of unconsumed payment tokens available for the associated payment card, e.g., by decrementing the count by one.

Referring to block 1108, at pre-defined intervals (e.g., once a day, once every few days, once a week), wallet management application 220 establishes a Bluetooth connection to payment card device 500 to query whether payment tokens on device 500 should be replenished. Upon receipt of a signal by wallet management application 220 from payment card device 500 indicating that the quantity of payment tokens for one or more payment cards has fallen below a pre-defined threshold, or otherwise signaling a request to replenish payment tokens, wallet management application 220, at block 1110, obtains additional payment tokens and then provisions these additional tokens to payment card device 500. Optionally, a different pre-defined threshold may be set for each particular payment card, e.g., based on how frequently that payment card is used, or based on quickly payment tokens were consumed.

Payment card device 500 may perform blocks 1108 while in its active mode.

In some embodiments, once payment card device 500 has completed initial setup in conjunction with a particular mobile device 102, 202, it becomes bonded to that particular mobile device 102, 202 so only that particular device 102, 202 can thereafter communicate by Bluetooth with it, e.g., to query the quantity of tokens remaining, or replenish payment tokens on payment card device 500. For example, payment card device 500 may establish an unique identifier (e.g., an electronic signature) for the particular mobile device 102, 202 and maintain the signature on a bonded device whitelist. The payment card device 500 will then reject Bluetooth connections from devices other than the bonded mobile device 102, 202. Using payment card device 500 with another mobile device 102, 202 requires resetting device 500.

Conversely, a single mobile device 102, 202 can be used to setup multiple payment card devices 500. Further, an applet (and payment tokens) for a single payment card can be loaded on multiple payment card devices 500.

Figure 12:
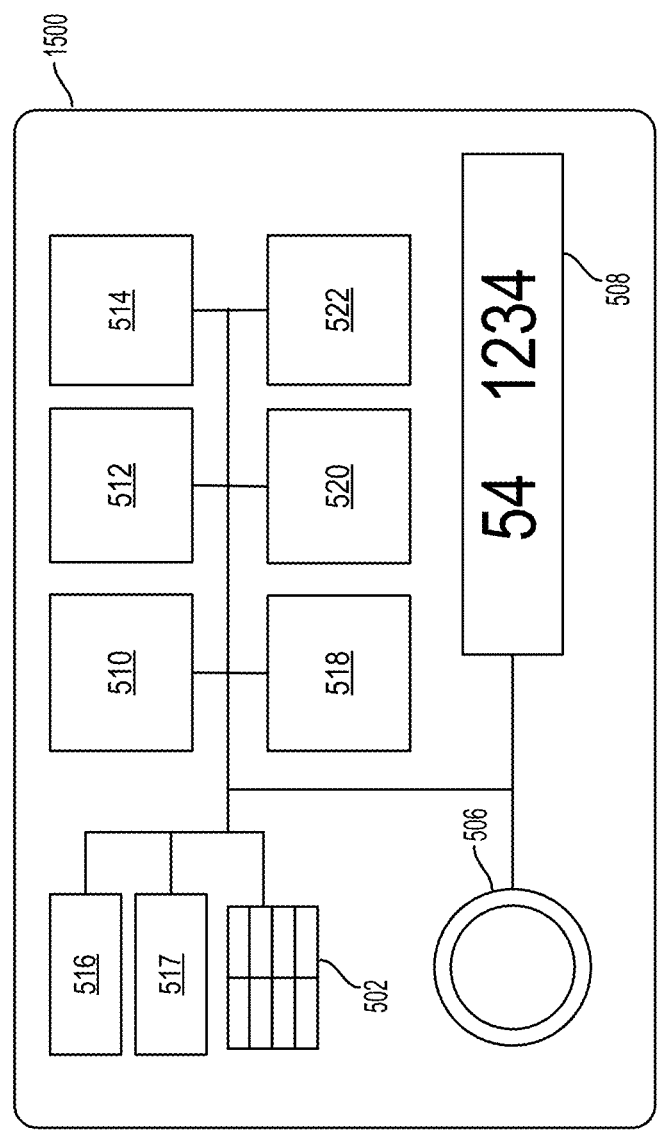
FIG. 12 is a schematic diagram of components of a payment card device, in accordance with a further embodiment.

FIG. 12 schematically illustrates a payment card device 1500, in accordance with another embodiment. As depicted, payment card device 1500 includes a second secure element 517, in addition to secure element 516. Like secure element 516, secure element 517 is also within a passive portion of payment card device 1500, and thus may be operated when device 1500 is in a sleep mode. Payment card device 1500 is otherwise substantially similar to payment card device 500.

Secure element 517 may be used by payment card device 500 to support functions other than payment processing, e.g., to store and transmit tokens, codes, or other data used for loyalty programs, or to store and transmit tokens, codes, or other data used to gain access to transportation systems (e.g., subways, buses, etc.). This allows payment card device 1500 to be used in place of one or more loyalty card, or in place of one or more transport cards (e.g., an Oyster Card, an Octopus Card, a Presto Card, etc.). Such other types of tokens may be referred to herein as non-payment tokens.

In some embodiments, a payment card device 1500 may include a plurality of secure elements, e.g., to be used with a corresponding plurality of functions.

In some embodiments, a payment card device 500 may store on a single secure element (e.g., secure element 516) a mixture of payment tokens and non-payment tokens.

In some embodiments, a payment card device may include a secure element storing tokens with bibliographic information of a user 10. Such bibliographic information may include for example, a name, a nationality, residence information, contact information, age, gender, or the like. Such tokens may be referred to herein as "identity tokens" and may be considered another type of non-payment token. Identity tokens may be cryptographically signed by a government entity (e.g., a passport office, a motor vehicle licensing office, a health administration, or the like). Alternatively, identity tokens may be cryptographically signed by a private establishment (e.g., a hotel or a private club), which may require presentation of a signed token in order to gain access to facilities or services. Conveniently, the use of identity tokens relieves user 10 of the need to carry or reveal to certain third parties various identification cards or documentation. In some embodiments, identity tokens may be reused and thus are not consumed when read from payment card device.

During operation, a user 10 may cycle through available payment tokens (e.g., by cycling through available payment cards as described above) and non-payment tokens, by pressing button 506. In this way, for example, embodiments of a payment card device as described herein may selectively emulate a payment card and an identity card.

Figure 13:
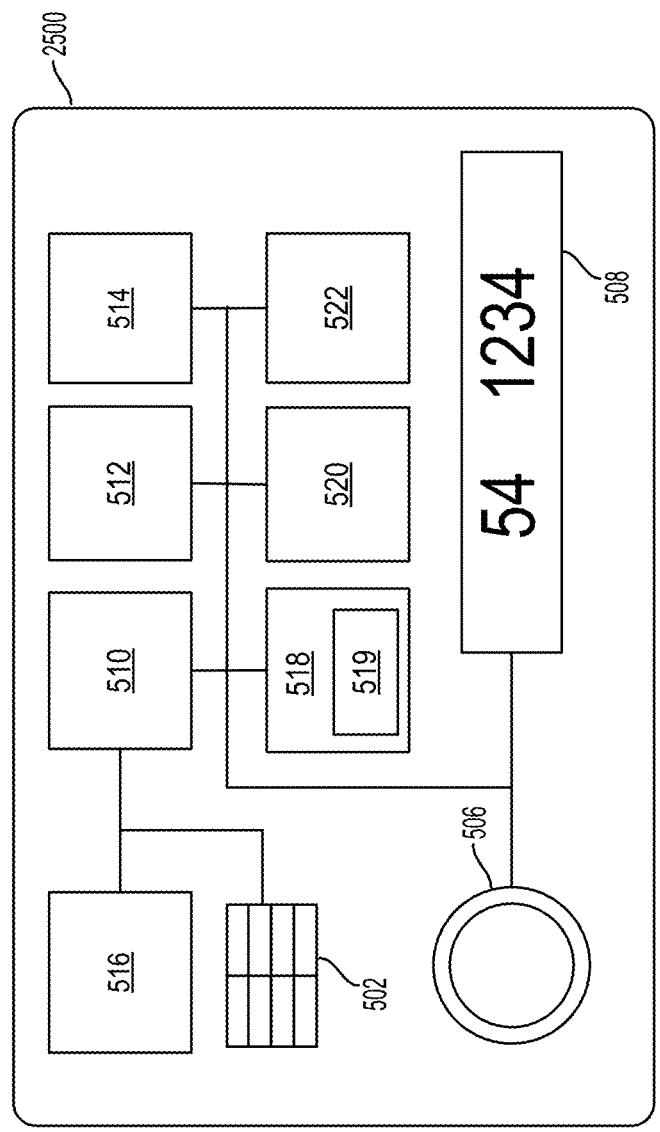
FIG. 13 is a schematic diagram of components of a payment card device, in accordance with a further embodiment.

FIG. 13 schematically illustrates a payment card device 2500, in accordance with another embodiment. As depicted, NFC subsystem 518 of payment card device 2500 includes an NFC reader 519. Payment card device 1500 is otherwise substantially similar to payment card device 500.

NFC reader 519 enables payment card device 2500 to read from another like payment card device, another payment card, an NFC tag or the like, by way of NFC. For example, payment card device 2500 may utilize NFC reader 519 to receive a payment token by way of an NFC transmission, e.g., to conduct a peer-to-peer payment.

In one particular embodiment, a payment card device 500 may be operated to receive a one-time password (e.g., from a mobile device 102, 202) in conjunction with a payment transaction. The one-time password may be a short alpha-numerical code. This one-time password may be displayed to the user in 508, who must then provide the code to a merchant to verify the transaction. In some cases, this password may be entered into a merchant POS terminal 14. In other cases, this password may be entered into an merchant app or webpage, e.g., as part of an online shopping payment process. In some cases, this one-time password may be used in place of a conventional CVV code.

In one particular embodiment, during operation, payment card device 500 may transfer a payment token to a mobile device 102, 202, and payment (contactless or contact-based payment) may be effected by presenting the mobile device 102, 202 to a merchant POS terminal 14. In this manner, a first user (e.g., owner of payment card device 500) may pay on behalf of a second user (e.g., an owner of mobile device 102, 202).

In the depicted embodiments, each payment card device includes a single button 506. However, in other embodiments, additional buttons can be included. For example, a payment card device may include two buttons, one to progress forward through an ordered list of payment cards (e.g., applets with available payment tokens), and one to progress backwards through the list of payment cards.

In the embodiments described above, payment card devices as shown to have a form factor substantially similar to conventional payment card. However, in other embodiments, a payment card device may have the form factor (or be embedded into) a ring, a bracelet, wallet, book, or other item commonly worn or carried by users.

Embodiments disclosed herein may be implemented by using hardware only or by using software and a necessary universal hardware platform. Based on such understandings, the technical solution may be embodied in the form of a software product. The software product may be stored in a non-volatile or non-transitory storage medium, which can be a compact disk read-only memory (CD-ROM), USB flash disk, a solid-state drive or a removable hard disk. The software product includes a number of instructions that enable a computer device (personal computer, server, or network device) to execute the methods provided in the embodiments.

Program code, which may be stored in memory (e.g., memory 522), may be applied to input data to perform the functions described herein and to generate output information. The output information may be applied to one or more output devices. In some embodiments, the communication interface with such output devices may be a network communication interface. In embodiments in which elements may be combined, the communication interface may be a software communication interface, such as those for inter-process communication. In still other embodiments, there may be a combination of communication interfaces implemented as hardware, software, and combination thereof.

Each computer program may be stored on a storage media or a device (e.g., ROM, magnetic disk, optical disc, solid-state drive), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

It will be noted that servers, services, interfaces, portals, platforms, or other systems formed from hardware devices can be used. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

As can be understood, the examples described above and illustrated are intended to be exemplary only. The scope is indicated by the appended claims.

What is claimed is:

1. An electronic payment device comprising:
a secure element for storing a plurality of applets for emulating a plurality of payment cards, and a plurality of consumable payment tokens, each of the tokens associated with one of a plurality of payment cards and provisioned by a second device;
an input interface that enables a user to select from among the plurality of payment cards;
a display interface;
a wireless communication interface; and
a processor in communication with the input interface, the secure element, and the display interface, the processor when executing code, causes the payment device to:
  receive a user selection of one of the plurality of payment cards by way of the input interface;
  in response to the user selection, display a descriptor of the selected payment card by way of the display interface;
  activate an unconsumed one of the payment tokens associated with the selected payment card and a particular applet of the plurality of applets for emulating the selected payment card to interact with a point-of-sale terminal, to prepare the payment device for effecting payment using the emulated payment card when the payment device is presented to the point-of-sale terminal, thereby consuming the activated payment token;
  store, in the secure element, a secure identifier for the activated payment token, the secure identifier associated with the second device;
  maintain an electronic signature for the second device on a whitelist, wherein the payment device is bonded to the second device by the whitelist, wherein the whitelist does not include any other electronic signature for any other device while the electronic signature for the second device is maintained on the whitelist, thereby allowing a wireless connection from only the second device for querying with regard to the plurality of consumable payment tokens;

receive, via the wireless communication interface, a query signal from the second device regarding the plurality of consumable payment tokens;

in response to receiving the query signal from the second device:

establish a wireless connection via the wireless communication interface with the second device based on the electronic signature on the whitelist; and transmit, via the established wireless connection to the second device, a request signal indicating a request for replenishing the plurality of consumable payment tokens; and subsequent to the request signal, receive, from the second device via the established wireless communication, at least one additional payment token, to replenish the plurality of consumable payment tokens.

2. The electronic payment device of claim 1, wherein the wireless communication interface includes a Bluetooth communication interface and the additional payment tokens are received by way of a Bluetooth transmission.

3. The electronic payment device of claim 1, wherein the at least one wireless communication interface is configured to receive a query regarding the quantity of unconsumed payment tokens.

4. The electronic payment device of claim 1, wherein the display interface includes an e-ink display.

5. The electronic payment device of claim 1, wherein the input interface includes a push button and a push of the push button causes a next one of the plurality of payment cards to be selected.

6. The electronic payment device of claim 1, wherein the device has a form factor resembling a payment card.

7. The electronic payment device of claim 1, wherein the device has a form factor resembling at least one of a ring or a bracelet.

8. The electronic payment device of claim 1, further comprising a rechargeable battery.

9. The electronic payment device of claim 8, wherein at least the secured element remains operable for effecting said payment when the rechargeable battery is discharged.

10. The electronic payment device of claim 1, wherein the descriptor is a subset of numerals in a card number of the selected payment card.

11. The electronic payment device of claim 1, wherein at least one of the plurality of consumable payment tokens expires after a pre-defined time interval.

12. The electronic payment device of claim 1, wherein at least one of the applets is configured to emulate the selected payment card by generating an authorization request cryptogram suitable for the selected payment card.

13. A processor-implemented method of maintaining unconsumed payment tokens at an electronic payment device, the method comprising:

storing, in a secure element, a plurality of applets for emulating a plurality of payment cards, and a plurality of payment tokens, each of the tokens associated with one of a plurality of payment cards and provisioned by a second device;

receiving a user selection of one of the plurality of payment cards;

in response to the user selection, activating one of the plurality of payment tokens associated with the selected payment card and a particular applet of the plurality of applets for emulating the selected payment card to interact with a point-of-sale terminal;

storing in the secure element, a secure identifier for the activated payment token, the secure identifier associated with the second device;

emulating the selected payment card using the particular applet to effect payment with the activated payment token;

updating the secure element to reflect the activated payment token as being consumed;

maintaining an electronic signature for the second device on a whitelist, wherein the payment device is bonded to the second device by the whitelist, wherein the whitelist does not include any other electronic signature for any other device while the electronic signature for the second device is maintained on the whitelist, thereby allowing a wireless connection from only the second device for querying with regard to the plurality of consumable payment tokens;

receiving a query, by way of a wireless communication interface from the second device, regarding a quantity of unconsumed payment tokens associated with each of the plurality of payment cards;

in response to receiving the query signal from the second device:

establishing a wireless connection via the wireless communication interface with the second device based on the electronic signature on the whitelist; and transmitting, via the established wireless connection to the second device, a request signal indicating a request for replenishing the plurality of payment tokens; and subsequent to the request signal, receiving from the second device at least one additional payment token, by way of the wireless communication interface, to replenish the plurality of payment tokens.

14. The processor-implemented method of claim 13, wherein the second device is a trusted mobile device.

15. The processor-implemented method of claim 14, further comprising: rejecting a request to communicate by way of the wireless communication interface from devices other than the trusted mobile device.

16. The processor-implemented method of claim 13, further comprising: transmitting NFC signals corresponding to the activated payment token to the point-of-sale terminal.

17. The processor-implemented method of claim 13, wherein said updating the secure element comprises decrementing a count of unconsumed payment tokens associated with the selected payment card.

18. The processor-implemented method of claim 13, further comprising: storing a plurality of non-payment tokens.

19. The processor-implemented method of claim 18, wherein the plurality of non-payment tokens include at least one identity token.

20. The processor-implemented method of claim 18, wherein the plurality of non-payment tokens are stored in a second secure element.

21. The processor-implemented method of claim 13, further comprising provisioning the electronic payment device with a further applet for emulating a further payment card in response to a user request.

22. The processor-implemented method of claim 13, presenting a graphical user interface for receiving a user request for a further payment card to be provisioned to the electronic payment device.

* * * * *